(12) United States Patent
de Bakker et al.

(10) Patent No.: US 12,411,020 B2
(45) Date of Patent: Sep. 9, 2025

(54) METHODS AND SYSTEMS USING DIGITAL MAP DATA

(71) Applicant: TomTom Global Content B.V., Amsterdam (NL)

(72) Inventors: Peter Foeke de Bakker, Barendrecht (NL); Cornelis Pieter Schuerman, Veldhoven (NL)

(73) Assignee: Tom Tom Global Content B.V., Amsterdam (NL)

( * ) Notice: Subject to any disclaimer, the term of this patent is extended or adjusted under 35 U.S.C. 154(b) by 51 days.

(21) Appl. No.: 18/603,018

(22) Filed: Mar. 12, 2024

(65) Prior Publication Data

US 2024/0263961 A1    Aug. 8, 2024

Related U.S. Application Data

(63) Continuation of application No. 17/761,513, filed as application No. PCT/EP2020/076884 on Sep. 25, 2020, now Pat. No. 11,965,752.

(30) Foreign Application Priority Data

Sep. 30, 2019    (GB) ..................................... 1914100

(51) Int. Cl.
*G01C 21/00*    (2006.01)
(52) U.S. Cl.
CPC ...... *G01C 21/3811* (2020.08); *G01C 21/3848* (2020.08); *G01C 21/3859* (2020.08); *G01C 21/3867* (2020.08); *G01C 21/3878* (2020.08); *G01C 21/3881* (2020.08)

(58) Field of Classification Search
None
See application file for complete search history.

(56) References Cited

U.S. PATENT DOCUMENTS 10,481,275 B2 *  11/2019  Chen ...................... G01S 19/40
2016/0196654 A1   7/2016  Satoshi et al.
2017/0212247 A1   7/2017  Yiqun et al.

FOREIGN PATENT DOCUMENTS

| JP | 2006259207 A | 9/2006 |
|----|--------------|--------|
| JP | 2017015458 A | 1/2017 |
| JP | 2019020260 A | 2/2019 |
| JP | 6528293 B1   | 6/2019 |

OTHER PUBLICATIONS

International Search Report dated Feb. 1, 2021 for International patent application No. PCT/EP2020/076884.
Search Report dated Jul. 30, 2020 for GB application No. 1914100.1.
Sanchez, L and Drewes H., Crustal Deformation and Surface Kinematics after the 2010 Earthquakes in Latin America, Journal of Geodynamics 102 (2016) 1-23, Dec. 2015.

* cited by examiner

*Primary Examiner* — Todd Melton
(74) *Attorney, Agent, or Firm* — Buckley. Maschoff & Talwalkar LLC

(57) ABSTRACT

The present disclosure generally relates to a methods and systems for compensating for changes in the absolute position of locations with respect to the Earth's surface which occur over time due to crustal dynamics. The invention is particularly, although not exclusively, concerned with such compensation in the context of methods using digital map data, for example, methods of localization of a vehicle.

22 Claims, 11 Drawing Sheets

METHODS AND SYSTEMS USING DIGITAL MAP DATA

RELATED APPLICATIONS

The instant application is a continuation application from, and hereby claims priority to, pending U.S. application Ser. No. 17/761,513, which was filed on 17 Mar. 2022. The instant application also claims priority, via parent application Ser. No. 17/761,513, to international application number PCT/EP2020/076884, which was filed on 25 Sep. 2020, and to UK application number 1914100.1, which was filed on 30 Sep. 2019.

FIELD OF THE INVENTION

The present disclosure generally relates to a methods and systems for compensating for changes in the absolute position of locations with respect to the Earth's surface which occur over time due to crustal dynamics. The invention is particularly, although not exclusively, concerned with such compensation in the context of methods using digital map data e.g. methods of localization of a vehicle.

BACKGROUND

Navigation systems are a known and widely used technology that support navigation for a user. The system usually consists of a navigation client and a navigation server. The navigation client is a software application that executes on a computing device. Navigation clients can be implemented as a software application on various types of device, including a mobile device, a personal navigation device, or an in-vehicle computing device. The navigation server provides the information in support of the navigation client.

Navigation systems use digital maps for supporting a driver to reach a desired destination. Such digital maps comprise segments connected by nodes, representing navigable elements (e.g. road elements) and junctions of a navigable network (e.g. road network). The digital map elements have associated navigation cost parameters. These are used in determining a cost for a path to a destination.

Digital maps supporting navigation functionality may be referred to as Standard Definition maps (SD maps). More recently, it has been recognised that there is need for more precise and detailed digital maps in order to support certain advanced driving applications e.g. autonomous driving applications, or Advanced Driver Assistance Systems (ADAS). Such advanced driving applications require digital maps that provide a highly detailed and precise 3D lane level detail, including geometry for lane markings, lane center lines and road boundaries. Digital maps for use in such contexts may be referred to as High Definition (HD maps). An HD Map extends the range of view for a vehicle and enables smoother, safer and more efficient driving scenarios. The HD Map can be leveraged to fulfil a broad range of advanced driving applications. The HD Map comprises arcs representing junction areas and lane groups, and nodes describing the connections between the arcs. Junction areas and lane groups describe the road surface from side to side (as well as along a direction of travel). Thus HD maps describe geospatial reality. Geospatial reality comprises a collection of geospatial objects with associated geometry and attribution which includes a position. The position is expressed by coordinates in the context of a reference frame, e.g. x, y, z coordinates in ITRF2014. The HD map information describes these objects with an approximate accuracy of $10^{-2}$-$10^{-1}$ meter.

HD map information is generated from a wide range of source data such as satellite and aerial imaging, sensor data from mobile mapping vehicles, information provided by navigation clients, processed sensor data from vehicles, web sourced information and crowd sourced information. These data sources usually are pre-processed and validated prior to being adopted in the HD map information compilation process.

Both SD Maps and HD Maps may be sub-divided into tiles and layers. A map tile describes a rectangular map area containing map information relevant to the area of the map. A map layer contains a sub-set of the available map information. For example, a HD map may comprise a HD road layer, a speed restrictions layer, a "RoadCheck" layer and a traffic signs layer. The HD road layer comprises map information related to arcs (representing junction areas and lane groups) and nodes (connecting the arcs). The map information of the speed restrictions layer describes speed restrictions. The traffic signs layer describes HD map objects that contain traffic related information. The HD map objects in the traffic sign layer also are important for localization as described below. The HD map contains additional layers. In summary, the HD map information is structured into map layers and map tiles.

A tile for a specific HD map layer is the unit of transfer of map contents between the HD map server and the HD map client in the vehicle. Such map contents is delivered using well known internet content delivery methods (IP, HTTP, HTTPS, CDN, etc.) and map generation infrastructures (Server, Cloud, etc.). In advanced driving applications (Advanced Driver Assistance Systems, Autonomous Driving) the HD map information may be obtained using this delivery infrastructure. In order for the HD map applications to know which HD map information to use, it first needs to determine the location of the vehicle. In particular it needs to determine this location with a comparable accuracy of the description of the objects in the HD map of approximately $10^{-2}$-$10^{-1}$ meter. The process of determining the position of the vehicle in the real world, typically by means of sensors and HD maps is called localization.

Real-time kinematic (RTK) is a localization technology that enhances the precision of position data derived from a Global Navigation Satellite System (GNSS) signal. A functional diagram of such a localization module is shown in FIG. 1.

FIG. 1 shows a real-time kinematic module that comprises a GNSS module and enhanced precision module. The GNSS module (e.g. GPS, GLONASS, Galileo, BeiDou) receives a satellite navigation signal from multiple satellites in view. It then uses these signals to compute ranges to these satellites which enable the GNSS module to determine an accurate location. The enhanced precision module of the RTK module obtains enhanced precision information from a wireless data signal, such as a long-range wireless internet data communication network or a similar wireless data transmission technology. The GNSS module uses this precision enhancement information to increase the accuracy of determining a location from the received satellite signals. The enhanced precision data usually relates to a specific epoch; an instant of time selected as a point of reference (as in astronomy). The RTK service provider defines the epoch associated with the precision enhancement information.

Another implementation of localization uses on-board sensors in a vehicle such as radar, lidar, sonar, odometry and inertial measurement units. Advanced processing of the sensor data provides information about geospatial objects near the vehicle. These objects can be matched to the HD map information to determine a location (and orientation) of the vehicle. A functional diagram of such a localization implementation is shown in FIG. 2.

FIG. 2 shows an HD map localization module that consists of an object detection module and a map object matching module. The object detection module receives sensor data and processes it to extract information of relevant geospatial objects. The object detection module sends the detected objects to the map object matching module. The map object matching module compares the detected object information with object information obtained from the HD map data. When a match is found, the map object coordinates are used to determine the location of the vehicle. Examples of this technology are described in WO2009098154 and WO2018104563. The map object matching module preferably only considers an area of a few hundred meter around a rough estimate of a vehicle location.

The matching of detected geospatial objects to objects described in HD map information generates a location and orientation of a vehicle on the map. The HD map localization gives localisation results with an accuracy in the range of $10^{-2}$-$10^{-1}$ meter.

Some vehicles may adopt multiple localization techniques using different technologies in order to increase resilience of the localization. So when one of the localization technologies provides inaccurate or no location information, the localization still can be supported by another localisation technology.

Certain problems may arise when using digital map data, as the absolute position of geospatial features with respect to the Earth's surface changes over time as a result of crustal dynamics. Such movements may be the result of gradual movement of tectonic plates, and/or more sudden movements, e.g. at plate boundaries, which may result from an earthquake or other geological event. Failure to take into account such effects may result in digital map data becoming inaccurate over time. This may result in inconsistencies and inaccuracies in methods using digital map data. While the accuracy of digital map data is of importance in many applications, as described above, one particularly important application is that of localization. If digital map data used in such an application is inaccurate, this may result in conflicts or inconsistencies between localization results based on different technologies, and/or in accuracies in the result of the localisation processes. Such issues may have serious consequences in some advanced driving applications, such as autonomous vehicle guidance or Advanced Driver Assistance Systems (ADAS).

The Applicant has realised there is a need for methods which may enable changes in the absolute position of geo-spatial features with respect to the Earth's surface over time, as a result of crustal dynamics, to be taken into account e.g. when performing methods using digital map data.

SUMMARY

In accordance with a first aspect of the present invention, there is provided a method of generating displacement map data for use in compensating for changes in the absolute position of locations with respect to the Earth's surface over time occurring as a result of crustal dynamics, the method comprising;
selecting a set of a plurality of reference locations in a geographic area covering at least a portion of the Earth's surface, wherein the absolute positions of the reference locations with respect to the Earth's surface change over time as a result of crustal dynamics;
obtaining position data indicative of the absolute position of each reference location at different times;
and using the position data indicative of the absolute position of each reference location at the different times to generate displacement map data, wherein the displacement map data comprises, for each reference location, data indicative the change in the absolute position of the reference location over time.

The present invention in this aspect is directed to a method of generating displacement map data for use in compensating for changes occurring in the absolute position of locations with respect to the Earth's surface occurring as a result of crustal dynamics. The absolute position of a location refers to the real-world position of the location. The absolute position of a location as referred to herein is the position of the location with respect to a fixed reference frame. The fixed reference frame may be defined by a given coordinate system which is fixed with respect to the Earth's surface. For example, the coordinate system may comprise longitude and latitude coordinates. An elevation may optionally also be considered. The fixed reference frame is fixed i.e. defined with respect to the Earth's surface, such that a change in the position of a location with respect to the reference frame corresponds to a change in position of the location with respect to the Earth's surface. Thus, a change in the position of a location due to crustal dynamics e.g. a change in a position which occurs by virtue of movement of a tectonic plate with which the location is associated, will result in a change in the position of the location with respect to the reference frame. The reference frame does not change as a result of crustal dynamics.

In embodiments, a set of a plurality of reference locations in a geographic area extending over at least a portion of the Earth's surface is selected. Each reference location is a location having an absolute position. As described above, the absolute position is a position in an absolute coordinate system, which defines a reference frame. The reference frame is a fixed reference frame with respect to the Earth's surface. The absolute position refers to a real-world position. The absolute position may be, for example, a GPS position, or a position defined using any suitable standard absolute position reference frame.

The absolute position of the reference location changes with respect to time. Such a change is a result of crustal dynamics. As discussed above, crustal dynamics may cause the absolute position of a geospatial feature to change over time. The crustal dynamics may be caused, at least in part, by tectonic plate movements. Such movements in absolute position resulting from crustal dynamics may include continuous movements, e.g. a gradual shift, and/or may include sudden movements, e.g. as may result from earthquakes. The rate of movement of the absolute position of a location may vary at different locations with respect to the Earth's surface, and/or with respect to time.

The displacement map data is for use in compensating for changes in the position of locations over time occurring as a result of crustal dynamics, wherein the absolute positions of the reference locations change over time as a result of crustal dynamics.

In accordance with the invention, data indicative of an absolute position of each reference location is determined at different times, and displacement map data is obtained using the data, the displacement map data being indicative of the change in the absolute position of each reference location over time. A change in position of a reference location between different times may be referred to as a displacement of the reference location. The position of a reference location at a given time may be defined by a set of coordinates. The change in position of a reference location over time may be a change in the coordinates of the reference location over time.

While the change in absolute position of a location with respect to the Earth's surface is defined with respect to a fixed reference frame with respect to the Earth's surface, and is a change in position in the real world, the position data indicative of the absolute position of each reference location at different times (and hence the data indicative of the change in the absolute position of the reference location) may be determined with respect to any desired frame of reference provided that it is indicative of the absolute position of the location with respect to the Earth's surface i.e. in the real-world at the different times. For example, the reference locations may be defined with respect to the frame of reference i.e. coordinate system of a digital map, or by reference to a real-world reference system, such a GPS system, or vehicle reference system etc. However, in other embodiments the position data is defined by reference to the fixed reference frame itself. It is envisaged that the data indicative of the change in absolute position may be with respect to the same or a different reference frame to the obtained position data indicative of the absolute position of the reference location.

The data indicative of a change in the absolute position of a reference location over time may be associated in the displacement map data with data indicative of an absolute position of the reference location at a reference time. The data indicative of the absolute position of the reference location may be directly or indirectly indicative of the absolute position of the reference location e.g. an identifier for the reference location enabling the absolute position data to be obtained may be used, and the data may be expressed with respect to any desired reference frame. For example, the data may be with respect to a digital map. The absolute position of the reference location is an absolute position of the location at a reference time. Data indicative of the reference time is preferably also associated with the change in position data i.e. displacement data for the reference location. As mentioned below, data indicative of the displacement of a reference location in respect of a plurality of different times may be obtained. In such embodiments, data indicative of the displacement of the reference location at each of a plurality of different times may be obtained, each displacement value e.g. vector being associated with data indicative of the time to which it relates, and optionally data indicative of the absolute position of the reference location at that time. The time to which the displacement data relates may be a reference time e.g. the time to which the displacement data applies, such as a time of generation of the data, or an initial time. Any arrangement may be used which enables the displacement data to be used to determine the position of the location at a given time.

The method comprises using the position data indicative of the absolute position of each reference location at different times to obtain data indicative of the change in the absolute position of each reference location over time. The displacement map comprises data indicative of a change in the absolute position of each reference location over time. The data indicative of the change in the absolute position of each reference location may be referred to as "displacement" data.

While a change in absolute position of a reference location between different times may be one-dimensional, in embodiments the difference is a multi-dimensional e.g. two or three-dimensional. In embodiments the data indicative of the change in the absolute position of each reference location over time comprises a set of one or more vectors. Each vector may be e.g. a two or three dimensional vector.

Position data indicative of the absolute position of each reference location at different times is obtained. Such data may be obtained in respect of a first time, and one or more subsequent times. Thus, in a simple embodiment, such data may be obtained in respect of (only) a first time and a second, subsequent time. However, obtaining such data in respect of additional subsequent times may enable a variation in position of the reference location with respect to time to be determined, and may facilitate determining a difference in the absolute position of the reference location between any two times of interest to be more readily obtained.

In some embodiments the data indicative of the change in the absolute position of the reference location over time comprises a set of one or more displacement vectors, each displacement vector being indicative of a change in the absolute position of the reference location between different times. The step of using the position data indicative of the absolute position of each reference location at different times to generate the displacement map may then comprise obtaining a set of one or more displacement vectors in respect of each reference location, each displacement vector being indicative of a change in the absolute position of the reference location between different times. The different times, may be any pair of ones of the different times for which position data indicative of the absolute position of the reference location was obtained e.g. successive ones thereof, or a first time and the or each subsequent time. Various exemplary embodiments are described below. In some embodiments, a plurality of displacement vectors may be obtained in respect of each reference location, each vector being in respect of a different pair of times e.g. successive times, or a first time and the or each subsequent time. Each displacement vector may then be associated with a time to which it relates e.g. the later one of the pair of times used in determining the vector.

In embodiments, the displacement map data comprises, for each reference location, data indicative of a displacement of the reference location between a first pair of times,
wherein the method comprises, for each reference location;
obtaining position data indicative of the absolute position of the reference location at each time in the first pair of times;
using the obtained position data indicative of the absolute position of the reference location at each time in the first pair of times to determine a displacement of the reference location between the times in the first pair of times, the displacement being indicative of the difference in the absolute position of the reference location between the times in the pair of times;
and associating displacement data indicative of the displacement of the reference location with data indicative of the reference location.

Preferably the displacement data comprises a displacement vector as described above.

The first pair of times may be selected as desired. The first pair of times comprises an earlier time, which may be referred to as the first time, and a later time, which may be referred to as the second time. The first time may be any time of interest with respect to which displacement data is desired to be generated. The first time may be any reference time. The first time may be a reference time associated with a digital map. Such a time is referred to as an epoch of the map. The map represents the situation at a particular point in time, corresponding to the epoch of the map. This may be a time of generation of the digital map. This may enable the displacement map data to be used to determine the manner in which the positions of locations according to the digital map should be shifted when the map data is used at a later time to account for changes in the absolute position of the locations which can be expected to have occurred due to crustal dynamics. The second time may then be a time at which the map data is to be used e.g. a time at which localization is performed using the data (i.e. a localization epoch). This may be a current time. Alternatively, the first time may be a time of acquisition of sensor data to be used in a map compilation process (i.e. an acquisition epoch). The second time may then be a time at which map compilation is performed (i.e. a map (generation) epoch). This may enable the displacement map data to be used to determine the manner in which the positions of locations according to the sensor data should be shifted when the sensor data is used to compile the digital map to account for changes in the absolute position of the locations which can be expected to have occurred due to crustal dynamics. In yet other embodiments, the first time may be a digital map generation time (e.g. map epoch) and the second time may be a time associated with the acquisition of sensor data to be used in updating the digital map (e.g. an acquisition epoch). This may enable a map compiler to determine a displacement from a later acquisition time to the earlier map generation time in order to incorporate the acquired sensor data to update only a portion of the digital map, and without needing to update the entire map. The second time may be a current time or any desired reference time e.g. if a shift to an earlier time/epoch is desired.

The method may comprise associating the displacement data with data indicative of the later of the first pair of times i.e. the second time. This time defines the time to which the displacement data applies. In effect, the displacement data for the reference locations provides a displacement map for the second time, indicative of the displacement of the absolute positions of the reference locations since the first time.

The displacement data is associated with data indicative of the reference location. The data indicative of the reference location may be indicative of the position of the reference location at a reference time e.g. the second time of the pair of times. Thus the displacement data may be associated with data indicative of a time to which it relates, and data indicative of the position of the reference location at that time. This may enable the relevant displacement data to easily be identified when such data is later required. However, it is envisaged that the data indicative of the reference location may be associated with data indicative of the position of the reference location at a different time e.g. the first time in other contexts. The data indicative of the position of the reference location may be in any desired frame of reference, and may or may not be an absolute position e.g. it may be a position with respect to a digital map.

In preferred embodiments the method is repeated for at least one further pair of times. The displacement map data may then comprise, for each reference location, data indicative of a displacement of the reference location between at least one further pair of times, wherein the method comprises, for each reference location, and for each further pair of times;
    obtaining position data indicative of the absolute position of the reference location at each time in the pair of times;
    using the obtained position data indicative of the absolute position of the reference location at each time in the pair of times to determine a displacement of the reference location between the times in the pair of times, the displacement being indicative of the difference in the absolute position of the reference location between the times in the pair of times;
    and associating displacement data indicative of the displacement of the reference location with data indicative of the reference location. The displacement data may comprise a displacement vector.

In these embodiments, each further pair of times comprises an earlier time and a later time. In some embodiments the earlier time of each pair corresponds to the first time. In this manner, further sets of displacement data may be provided indicative of the displacement of each reference location between the first time and a respective one of one or more subsequent times. However, this need not necessarily be the case. For example, displacement data may be obtained between a subsequent time and the later time of the pair of times.

The method may comprise the step of associating the displacement data with data indicative of a time to which the displacement data applies. The time may be the later of the pair of times. In this way, displacement data is provided in respect of a plurality of different times, indicative of the displacement of each reference location since the first time. When it is desired to obtain displacement data, the data relevant to that time may be retrieved. These embodiments may be achieved by updating the displacement map data on a regular basis.

The displacement data is associated with data indicative of the reference location. The data indicative of the reference location may be indicative of the position of the reference location at a reference time e.g. the second time of the pair of times. This position may be with respect to any desired reference system. Thus the displacement data may be associated with data indicative of a time to which it relates, and data indicative of the position of the reference location at that time. This may enable the relevant displacement data to easily be identified when such data is later required. In these embodiments, a set of multiple displacement values e.g. vectors may be obtained, in respect of successive times.

In embodiments, the method is repeated at successive times, with the later one of each pair of times being the current time. It may be useful to obtain displacement data in respect of a plurality of different times, as this may provide displacement data for a current time, and one or more previous times. In embodiments in which the earlier time used when deriving each set of displacement data is the same, e.g. the first time, this may provide an indication of the displacement of the absolute position of each reference location at various different times since the first time e.g. a map generation or sensor acquisition time.

The method may simply be repeated at successive times to regularly update the displacement map data, such that the first and second times of the first pair of times, and the times of any subsequent pairs of times, may simply be arbitrary times. For example, the data may be determined using a first pair of times, corresponding to first and second times, and then for further pairs of times, each comprising the first time and a subsequent time, or between subsequent times. In each case, a set of displacement data applicable to a particular time is obtained, enabling the displacement of a location to be determined with respect to the first time, or, in embodiments, any one of the earlier times. Thus, while the times may correspond to the times of events such as map generation, sensor acquisition etc., the method may be performed without reference to such events, with those events then being used to retrieve the applicable data when the displacement map data is subsequently used.

While in simpler embodiments, the data indicative of the change in absolute position of a reference location over time is indicative of a difference in the position between one or more pair of different times, in other embodiments, it is envisaged that the data indicative of the change in absolute position of the reference location over time may comprise a function indicative of a variation in the absolute position of the location with respect to time.

Alternatively or additionally, in some embodiments the data indicative of the change in absolute position of the reference location over time comprises data indicative of a rate of change of the absolute position of the reference location i.e. a speed or velocity of the reference location. The step of using the position data indicative of the absolute position of each reference location at different times to generate the displacement map may then comprise using the e position data indicative of the absolute position of each reference location at different times to determine data indicative of a speed of the reference location. It will be appreciated that data indicative of the speed of the reference location may be used to determine a difference in the absolute position of the reference location (i.e. displacement) between a reference time and any future time of interest (or indeed a past time of interest). This will simply require knowledge of the two times or time difference of interest. Such embodiments are particularly applicable where the speed of the position of the reference location is, or may be assumed to be, constant with respect to time. However, the speed need not necessarily be constant. The data indicative of the speed of the reference location may be indicative of a function describing a time varying speed. The method may comprise associating data indicative of an absolute position of the reference location at a reference time with the reference location for use in determining the displacement of the location at a time of interest. It will be appreciated that the displacement may be in terms of a velocity or speed in these embodiments.

In embodiments in which the displacement map data comprises speed data, it may provide a displacement speed map. In embodiments in which the data indicative of the change in absolute position of the reference location over time comprises data indicative of a speed of the reference location, the data preferably further comprises data indicative of a reference time. This may enable the displacement of the location to be determined for any future time based on a difference between the time for which the displacement data is required and the reference time. The reference time may be an earliest one of the different times used in determining the data indicative of the change in position of the reference location.

The reference locations may be any geo-spatial locations for which accurate position data at different times, and hence, accurate displacement values, may be obtained, whether by measurement, modelling, or combinations thereof. For example, in some embodiments the reference locations are locations of permanent GNSS receivers, such as Continuously Operating Reference Stations (CORS) in the US, or such receivers operated by the RTK service (Real-Time Kinematics).

The reference locations are real-world locations in a geographic area extending over a portion of the Earth's crust.

The set of one or more reference locations may form a network of reference locations.

The reference locations may be uniformly or non-uniformly distributed across the geographic area. For example, where an sub-area is associated with lower levels of crustal activity e.g. in the centre of large tectonic plates, the reference locations may be sparser than in sub-areas associated with greater levels of crustal activity e.g. at plate boundaries. In embodiments the reference locations are distributed across the geographic area with a density which varies dependent upon crustal activity within the geographic area. The density of the reference locations is greater in regions of greater crustal activity and smaller in regions of lesser crustal activity.

In some preferred embodiments, the set of reference locations correspond to the vertices of a set of triangles covering the geographic area. The set of triangles are preferably tessellating triangles. In other words, the triangles fit together to cover the geographic region without leaving any gaps between the triangles. The triangles may be of the same, or differing area. In preferred embodiments the density of the reference locations, and hence the areas of the triangles varies across the geographic area.

It will be appreciated that the data indicative of the change in the absolute position of the reference locations defining the vertices of a triangle in such embodiments (i.e. displacement data for the reference locations) may be used to estimate data indicative of an expected change in the absolute position of any other location covered by the triangle (i.e. an expected displacement). This includes locations on or within the perimeter of the triangle. The method may comprise, for a location of interest covered by one of the triangles, and which does not correspond to one of the reference locations, using the data indicative of the change in absolute position of the reference locations defining the vertices of the triangle to estimate data indicative of an expected change in absolute position of the location. Such methods may be performed using interpolation. For example, such a method may be performed by interpolation using Barycentric coordinates to estimate the change in position. The data indicative of the expected change in absolute position of the location may be with respect to any desired reference system, e.g. a map reference system.

In some embodiments, it is envisaged that the displacement map data may be provided as a displacement map data layer associated with a digital map. The digital map may be divided into a plurality of map tiles. In embodiments in which the reference locations correspond to vertices of a set of triangles covering the geographic area, the method may comprise determining, for each map tile, the or each triangle covering at least a part of the geographic area covered by the map tile, and associating data indicative of the or each triangle with the map tile. The displacement data associated with the reference locations defining vertices of the or each triangle may then be used to determine displacement data for the map tile. Where a map tile is relatively large, it may encompass portions of multiple triangles. However, where the map tiles are relatively small, a map tile may lie entirely within a single triangle.

In some embodiments, in which the map tile lies within a single triangle, the method may comprise using the displacement data associated with vertices of the triangle to determine a single displacement value for the map tile in respect of each one of one or more given times. The times may correspond to the or each later time of a first and one or more further pairs of times for which displacement data was obtained.

Whether or not an intermediate step involving triangles having, as their vertices, the reference locations is used, the method may comprise using the displacement map data to determine displacement data in respect of each one of the map tiles, and associating the displacement data with the tiles. The method may comprise obtaining data indicative of a plurality of digital map tiles, using the displacement map data to determine displacement data in respect of each one of the map tiles, and, for each map tile, associating the displacement data with the tile. A single displacement value for each map tile may be obtained in respect of each of one or more given times. The times may correspond to the or each later time of a first and one or more further pairs of times for which displacement data was obtained.

In these embodiments, the displacement values may be distributed as a mesh grid indicative of the map tiles. As displacements for tiles which are relatively close may be assumed to be similar, the displacement map data may be subjected to any suitable compression technique.

The present invention extends to the use of displacement map data obtained in accordance with any of the embodiments of the invention described herein.

The displacement map data may be useful in various contexts involving digital map data.

In accordance with a further aspect of the invention there is provided a method of transforming the position of one or more location of interest from a first reference frame to a second reference frame, wherein at least one of the first and second reference frames is a reference frame associated with a digital map covering a geographic region including the location of interest, wherein the position of the location of interest with respect to said at least one of the first and second reference frames is a position with respect to the digital map;
the method comprising, for the or each location of interest:
obtaining data indicative of the position of the location of interest with respect to the first reference frame;
obtaining displacement map data comprising, for each of one or more locations, data indicative of a change in the absolute position of the location with respect to the Earth's surface occurring over time as a result of crustal dynamics;
and using the obtained data indicative of the position of the location of interest with respect to the first reference frame and the displacement map data to determine data indicative of the position of the location of interest with respect to the second reference frame;
wherein the step of using the obtained data indicative of the position of the location of interest with respect to the first reference frame and the displacement map data to determine data indicative of the position of the location of interest with respect to the second reference frame comprises using the displacement map data to adjust a position of the location of interest when transforming the position of the location of interest from the first reference frame to the second reference frame;

and wherein the method further comprises generating data indicative of the determined position of the location of interest with respect to the second reference frame for output.

While the invention will be described in relation to the transformation of a location of interest between reference frames, it will be appreciate that any of the steps or other features described herein may be applicable to the transformation of any further location of interest where multiple locations of interest are considered.

The displacement data is used to compensate for changes in the corresponding absolute position of the location of interest in the real-world which have occurred due to crustal dynamics.

The first and second reference frames are each associated with a respective coordinate system. The reference frames may be defined by the coordinate systems. The position of the location of interest with respect to each reference frame may be defined with respect to a coordinate system associated with the respective reference frame. The coordinate systems associated with the first and second reference frames may be referred to as the first and second coordinate systems.

The present invention is particularly applicable to transforming the position of one or more location of interest between a reference frame used by a vehicle and a reference frame used by a digital map (in either direction). This may enable the position of a location of interest determined in relation to the reference frame of the vehicle to be determined in relation to a digital map, or vice versa.

The vehicle reference frame is a reference frame which is common to all systems in the vehicle. Such systems may include a localization system. The vehicle reference frame is a reference frame defined with respect to the real world. The reference frame may be an absolute reference frame. This may be, for example, a standard reference frame, such as a GPS based reference frame. However, in other embodiments the reference frame may be any arbitrary reference frame that is common to all systems in the vehicle. In contrast, the digital map reference frame is a reference frame defined with respect to a representation provided by the digital map of the real-world.

In some preferred embodiments one of the first and second reference frames is a reference frame associated with a digital map, and the other one of the first and second reference frames is a reference frame associated with a vehicle. The method is preferably performed in as part of a process of localizing the vehicle. The term "localizing" refers to the process involving determining a position of the vehicle in the real world. The vehicle may be a vehicle traversing a path through the navigable network represented by the digital map.

The digital map (or any digital map referred to herein) may comprise a plurality of segments connected by nodes, the segments representing elements of a navigable network in the geographic region covered by the digital map. References to a vehicle traversing a path through the navigable network should be understood to refer to the vehicle travelling through the navigable network in any manner, and not necessarily along a predetermined route.

In some embodiments the location of interest is the location of an object encountered by or expected to be encountered by the vehicle while traversing a path through the navigable network. The object may be an object which is to be used for localization purposes e.g. a feature such as a road sign, traffic light, road marking etc. The object may be an object detected by a vehicle system. The object is a real-world object.

It may be necessary to transform the position of an object in the vicinity of the vehicle encountered by i.e. detected by the vehicle while traversing a path through the navigable network, from the vehicle reference frame e.g. where the object has been detected by a vehicle system, such as by a set of one or more sensors thereof, to a position with respect to a digital map covering a geographic region including the location of the object. In other words, the position may be "map matched". The object is a real-world object. Where a position of an object is map matched, this may be used in determining a location of the vehicle in the real-world (which may or may not involve an intermediate step of determining the position of the vehicle with respect to the digital map.) The object position may be used together with other information in determining the location of the vehicle.

The displacement map data is used to adjust positions of locations of interest when transforming the position of the location of interest from the first to the second reference frame. The adjustment of the position of the location of interest may provide the transformation between frames, or may be carried out as part of such a transformation. The transformation may involve other adjustments e.g. to correlate positions between the different coordinate systems. However, in some embodiments, the adjustment of positions of locations of interest may define the second reference frame e.g. in embodiments in which the positions of map objects are adjusted to "shift" the map.

In some preferred embodiments the location of interest is the location of an object in the vicinity of the vehicle encountered by the vehicle while traversing a path through the navigable network. In this case, the object is a real-world object. The term "encountered by" encompasses the object being detected in any manner, e.g. by any sensor or sensors associated with the vehicle. The position of the location of the object may be a position which has been detected in a reference frame associated with the vehicle by a vehicle system e.g. based on data obtained from a set of one or more sensors associated with the vehicle.

Conversely, in other contexts, it may be necessary to transform digital map object data, such as a map object indicative of an object expected to be encountered by the vehicle while traversing the navigable network to be used for the purposes of localization e.g. a feature such as a road sign, traffic light, road marking etc., whether or not the object is in proximity to the vehicle, from the map reference frame to the vehicle reference frame. The map object may be indicative of an object expected to be encountered at a future time. For example, the vehicle may need to determine whether the object is detected by its systems in an expected position relative to the vehicle.

Certain processes involving transforming the position of locations of interest e.g. of objects in the real-world or map objects between reference frames e.g. coordinate systems associated with the vehicle and of a digital map to assist in determining a position of the vehicle in the real world may be referred to as "localization" processes. The determining of the position of the object may be used to confirm an expected position of the vehicle in the real-world, or to obtain the position of the vehicle in the real-world where no previous estimate thereof exists. Such processes may use the digital map data in combination with data relating to real-world position e.g. sensor data, such as may be obtained by a localization system associated with the vehicle.

In embodiments in which the generated data is indicative of a position of an object detected in the vicinity of the vehicle in a second reference frame which is a reference frame of a digital map, the method may involve transforming the position of the object in the map reference frame into the vehicle reference frame once more in order to determine a position of the vehicle in the real-world using the position of the object.

The method may comprise using the displacement map data to compensate for a change in the absolute position of the location of interest with respect to the Earth's surface expected to have occurred since generation of the digital map when determining the location of interest with respect to the second reference frame.

This may be performed in various manners and at various times in the process of obtaining the position of the location of interest with respect to the second reference frame. For example, the position of the location of interest with respect to the first reference frame may be transformed to a position with respect to the second reference frame, and the determined position with respect to the second reference frame then adjusted using the displacement map data. In other embodiments, the adjustment using the displacement map data may occur in the first reference frame before transformation of the position of the location of interest to the second reference frame. Rather than individually adjusting the position of the location of interest, in either reference frame, to compensate for the change in absolute position of the location of interest in the real-world, in some embodiments the digital map data is adjusted as a whole to compensate for changes in absolute position of locations therein using the displacement map data, before or after determination of the position of the location of interest with respect to the digital map.

In some embodiments the second reference frame is a reference frame associated with the digital map, and the first reference frame is associated with a vehicle traversing a path through a navigable network represented by the digital map. The displacement map data may be used to adjust the position of the location of interest when transforming the position of the location of interest from the first reference frame to the second reference frame to compensate for a change in the corresponding absolute position of the location of interest with respect to the Earth's surface (in the real-world) expected to have occurred since generation of the digital map as a result of crustal dynamics. The method may then comprise transforming the position of the location of interest with respect to the first reference frame to a position with respect to the second reference frame, and using the displacement map data to adjust the position of the location of interest with respect to the second reference frame to compensate for a change in the corresponding absolute position of the location of interest with respect to the Earth's surface (in the real-world) expected to have occurred since generation of the digital map due to crustal dynamics. The position of the location of interest with respect to the first reference frame may have been obtained by the vehicle system e.g. by a set of one or more sensors thereof. The location of interest may correspond to the position of an object detected by the vehicle system. The adjustment step may be performed as part of a process of map matching the object. In some embodiments the first reference frame is the reference frame associated with the digital map. The displacement map data may be used to adjust the position of the location of interest when transforming the position of the location of interest from the first reference frame to the second reference frame to compensate for a change in the corresponding absolute position of the location of interest with respect to the Earth's surface (in the real-world) expected to have occurred since generation of the digital map as a result of crustal dynamics.

The method may then comprise transforming the position of the location of interest with respect to the first reference frame to a position with respect to the second reference frame, and using the displacement map data to adjust the position of the location of interest with respect to the second reference frame to compensate for a change in the corresponding absolute position of the location of interest with respect to the Earth's surface (in the real-world) expected to have occurred since generation of the digital map due to crustal dynamics.

In other embodiments in which the first reference frame is the reference frame associated with the digital map, the method may comprise;

using the displacement map data to adjust the position of the location of interest with respect to the first reference frame to compensate for a change in the corresponding absolute position of the location of interest with respect to the Earth's surface expected to have occurred since generation of the digital map as a result of crustal dynamics, and then transforming the adjusted position of the location of interest with respect to the first reference frame to a position with respect to the second reference frame.

Thus, it will be seen that the adjustment of the position of the location of interest to compensate for the expected change in the absolute position of the location in the real-world due to crustal dynamics may occur before, during or after transformation of the position of the location into the second, i.e. vehicle, reference frame.

It will be appreciated that, in these embodiments, the position of the location of interest with respect to the first reference frame may have been obtained by map matching data indicative of the position of the location of interest obtained by the vehicle system e.g. by a set of one or more sensors thereof. Such a position obtained by the vehicle system may be in the second i.e. vehicle reference frame. Thus, an initial transformation of the position data for the location may have occurred in order to obtain the position data in the first (digital map) reference frame for transformation to the second reference frame in a manner so as to compensate for changes in the real-world position of the location of interest.

In embodiments in which the first reference frame is the reference frame associated with the digital map, the method may comprise obtaining a position of a location of interest with respect to the second reference frame (i.e. the reference frame of the vehicle system), and transforming the position of the location of interest with respect to the second reference frame to the first reference frame associated with the digital map to obtain the position of the location of interest with respect to the first reference frame which is then transformed back to the second reference frame in any of the manners described so as to compensate for changes in the position of the location in the real-world.

In some embodiments in which the first or second reference frame is a reference frame associated with the vehicle, the location of interest may be the location of an object encountered by the vehicle while traversing the path through the navigable network. The object may be an objected detected by a vehicle system.

However, in other embodiments in which the first reference frame is the reference frame associated with the digital map, the method may be performed in response to receiving a request for map object data. The location may then be the location of a map object. Such a request may be received from a vehicle system e.g. from HD map client. In these embodiments the location of interest in the first reference frame which is to be transformed in a manner which compensates for changes in the position of the location in the real-world which have occurred since generation of the digital map may be the location of a map object which has been requested by the vehicle e.g. by a vehicle system. The method may comprise providing, to the vehicle, data indicative of the map object, including the determined position of the location of the map object in the second reference frame (adjusted to compensate for changes in the absolute position of the location in the real-world since generation of the map due to crustal dynamics). The request for the map object data may be indicative of the position of the map object in the first or the second reference frame (i.e. the reference frame of the digital map or of the vehicle system). Where the request is received in the second, vehicle system reference frame, the method may involve an initial step of transforming the position of the map object in the second reference frame to a position in the first reference frame.

In these embodiments the method may further comprise determining displacement data indicative of a change in the absolute position of the location with respect to the Earth's surface which has occurred since generation of the digital map due to crustal dynamics and associating the displacement value with the data indicative of the position of the map object in the second reference frame. Such data may be provided to any vehicle system e.g. a HD map application. The system may be the same or different to a vehicle system which requested the data. In embodiments therefore the method may further comprise determining displacement data indicative of a change in the real-world position of the location which has occurred since generation of the digital map and associating the displacement data with the data indicative of the position of the map object in the second reference frame, and optionally providing the displacement data together with the data indicative of the position of the map object in the second reference frame to the vehicle.

In some embodiments the first and second reference frames are each associated with a digital map. The digital map may be the same digital map. The method may then comprise using the displacement map data to compensate for a change in the absolute position of a location of interest in the real-world expected to have occurred since generation of the digital map defining the first reference frame. The method may involve shifting the digital map to a second reference frame.

In some embodiments the method is performed in relation to a plurality of locations of interest, each location of interest being a location of a map object of a digital map, wherein the first and second reference frames are each associated with the digital map. In these embodiments the first and second reference frames are reference frames defined by the digital map before and after adjustment of the position of map objects therein using the displacement map data to compensate for changes in the corresponding absolute positions of the map objects in the real world with respect to the Earth's surface which may be expected to have occurred due to crustal dynamics since generation of the digital map. The step of obtaining data indicative of the position of each location of interest with respect to the first reference frame may comprise obtaining digital map data in the first reference frame, the digital map comprising the map objects;

determining the position of each map object with respect to the digital map in the first reference frame, and using the displacement map data to adjust the position of each map object to compensate for a change in the corresponding absolute position of the map object in the real world with respect to the Earth's surface which may be expected to have occurred since generation of the digital map due to crustal dynamics, thereby shifting the reference frame of the digital map from the first reference frame to a second reference frame. The first and second reference frames may be reference frames defined by a reference time associated with the map e.g. a map epoch, such as the time of generation of the map, and at a subsequent time of interest e.g. a time of localization.

The method compensates for changes in the corresponding absolute positions of map objects with respect to the Earth's surface which may have occurred since generation of the digital map in the first reference frame due to crustal dynamics. The method may compensate for changes in the corresponding position of map objects in the real world, which may or may not correspond to the absolute positions of objects in the real-world represented by the map objects, depending whether the map objects represent real-world objects.

It is believed that such embodiments are advantageous in their own right. In accordance with a further aspect of the invention there is provided a method of adjusting digital map data to compensate for changes in absolute position of locations with respect to the Earth's surface that may be expected to have occurred since generation of the digital map as a result of crustal dynamics, the method comprising;
  obtaining digital map data, the digital map data comprising data indicative of the position of a plurality of map objects;
  obtaining displacement map data comprising, for each of one or more locations, data indicative of a change in the absolute position of the location with respect to the Earth's surface occurring over time as a result of crustal dynamics;
  determining the position of each map object with respect to the digital map, and using the displacement map data to adjust the position of each map object to compensate for a change in the corresponding absolute position of the map object with respect to the Earth's surface which may be expected to have occurred since generation of the digital map as a result of crustal dynamics.

The present invention in this further aspect may include any or all of the features described in relation to the other aspects and embodiments.

In any of the embodiments of the invention involving determining adjusted digital map data, the method may comprise using the adjusted data in a map matching process.

The method may comprise receiving a request from a vehicle for map data indicative of the position of an object encountered by the vehicle, determining the position of the object with respect to the digital map data in the second reference frame, and using the determined data in providing data indicative of the position of the object to the vehicle. The step of using the data to provide the data indicative of the position of the object to the vehicle may, in some embodiments, comprise transforming the position of the object from the second reference frame back to the first reference frame, or providing the position data in the second reference frame to the vehicle. Thus, in these embodiments, the shifted map data may be used to provide compensated position data for map objects to the vehicle for any number of map objects, rather than requiring compensation for changes in the position of the map objects since generation of the map to be performed on an object by object basis.

The method may comprise the vehicle using the data indicative of the position of the object provided thereto in determining a position of the vehicle.

In accordance with any of the aspects or embodiments of the invention the method may comprise using the generated data indicative of the determined position of the location of interest with respect to the second reference frame in determining a position of the vehicle in the real-world e.g. with respect to the navigable network. The generated data may be used directly or indirectly in this determination. The data may be used along with other data as part of the localization process e.g. data indicative of the location of other objects, whether map objects or real world objects, and/or data of other types. Localization may involve the use of data from multiple sources.

Once the position of the vehicle has been determined, this may be used in various manners e.g. for navigation purposes, including advanced driver assistance or autonomous driving methods, or to obtain digital map data relating to the position of the vehicle etc.

The digital map which defines one (or both) of the reference frames, may be any suitable digital map that is used in the context to which the invention is applied. In preferred embodiments in which the invention is used in the context of localization of a vehicle the digital map is may be a so-called "High Definition" digital map. Such maps provided a highly detailed and precise representation of the navigable network, including lane level detail e.g. lane marking geometry, lane centre lines, road boundaries etc. Such maps may be suitable for use in the implementation of ADAS (advanced driver assistance systems) and/or autonomous vehicle guidance applications. The digital map data may be based on map data that has been compiled over time by a map source provider. Such map data may be compiled using information obtained from a variety of sources including, but not limited to; satellite and other aerial image data (for basic road geometry), a dedicated fleet of mapping vehicles, navigation applications run by devices associated with vehicles traversing the navigable network, web sourcing and crowd sourcing.

The digital map data is associated with a reference time. The reference time may be referred to as a map epoch. The map represents the situation at the map epoch. The map epoch typically corresponds to a time of generation of the map. However, in some cases, the map epoch will be an earlier reference time to which the map data was adjusted at generation. The time of generation may correspond to a time at which the map was compiled. It may be assumed that the digital map provided an accurate representation of the geographic region e.g. of a navigable network in the geographic region, at the time of its generation, or the map epoch (if different). However, given that the compilation and maintenance of digital map data may involve considerable time and resource, updating of the digital map data may not be performed often. By the time that the digital map data is used e.g. by a localization system associated with a vehicle, some time may have elapsed. Due to the movement of the position of real-world locations which may have occurred in the intervening period, e.g. due to crustal dynamics, as described above, the digital map may no longer accurately represent the position of locations in the real world. The present invention uses the displacement map data to adjust for any such changes in the position of real-world locations i.e. the absolute positions of the locations, which may have occurred. This enables a digital map to be used for longer periods without an update.

In accordance with any of the embodiments of the invention, the methods described herein may comprise using the displacement map data to compensate for a change in the absolute position of the location of interest in the real-world expected to have occurred between generation of the digital map (or the map epoch if different) and any time of interest when transforming the position of the location of interest from the first frame to the second reference frame. The time of interest is preferably a current time. The current time may be the time at which the transformed position data in the second reference frame is required e.g. by a localization system of a vehicle. Any reference herein to adjusting the position of a location of interest to compensate for a change which has occurred since the map generation time, may be amended to refer to any reference time associated with the map e.g. a map epoch, if different. The map represents the navigable network at the map epoch time.

The displacement information which may be provided by a displacement map is also of utility in the context of compiling a digital map. A digital map may be compiled from multiple sources of data. The digital map may be based at least in part upon sensor data indicative of the position of locations of objects collected at one or more times prior to the time of compilation of the digital map. The displacement map data provides a way of compensating for changes in the position of the locations of objects according to the sensor data which may have occurred between the collection of the sensor data and the time of compilation of the map.

It is believed that such embodiments are advantageous in their own right. In accordance with a further aspect of the invention there is provided;

a method of compiling a digital map,
the method comprising;
acquiring sensor data indicative of the position of one or more objects at a first time;
and compiling a digital map using the obtained sensor data at a subsequent time;
wherein the method comprises;
obtaining displacement map data comprising, for each of one or more locations, data indicative of a change in the absolute position of the location with respect to the Earth's surface over time as a result of crustal dynamics;
and, when compiling the digital map, using the displacement map data to adjust a position of the location of the or each object to compensate for a change in the corresponding absolute position of the location of the object with respect to the Earth's surface expected to have occurred since acquisition of the sensor data as a result of crustal dynamics.

The sensor data may be indicative of the position of the one or more objects in the real world i.e. an absolute position. The method may be performed in relation to sensor data indicative of the position of one or more objects acquired at different times, with an appropriate adjustment of the position of the location of the or each object being made using the displacement data for each time.

The step of compiling the digital map may comprise using the obtained sensor data and data from one or more other source.

The present invention in this further aspect may include any or all of the features described in relation to the other aspects and embodiments of the invention, to the extent they are not mutually exclusive.

In accordance with yet another aspect of the invention there is provided a method of updating a digital map,
the method comprising;
acquiring sensor data indicative of the position of one or more objects at a first time;
and updating a digital map generated at an earlier time using the obtained sensor data;
wherein the method comprises;
obtaining displacement map data comprising, for each of one or more locations, data indicative of a change in the absolute position of the location with respect to the Earth's surface over time as a result of crustal dynamics;
and, when updating the digital map, using the displacement map data to adjust a position of the location of the or each object to compensate for a change in the corresponding absolute position of the location of the object with respect to the Earth's surface expected to have occurred between the generation of the map and the acquisition of the sensor data as a result of crustal dynamics.

In these further aspects, the sensor data is adjusted to an earlier, map generation time e.g. a map epoch, such that it may be used to update the map but in a manner which adjusts the sensor data to compensate for changes due to crustal dynamics in order to reflect the position of the detected objects at the earlier map generation time.

The present invention in this further aspect may include any or all of the features described in relation to the other aspects and embodiments of the invention, to the extent they are not mutually exclusive.

The displacement map data used in any of the aspects or embodiments of the invention may comprise data obtained in accordance with any of the earlier described embodiments. The data that is used may be at least a portion of the obtained displacement map data.

In some preferred embodiments, the one or more locations for which absolute position change data is provided are reference locations. The reference locations may correspond to any one or more of the reference locations for which displacement map data is obtained. In embodiments the displacement map data comprises, for each one of a plurality of reference locations, data indicative of a change in the absolute position of the reference location over time. However, it is envisaged that absolute position change data i.e. displacement data, may be provided in respect of only one location. The location may be a region, such as a map tile, as described below, or may be a location within such a map tile. Thus, the location to which the displacement map data used in these further aspects relates, may or may not be a reference location used in the generation of the displacement map data, depending upon the manner in which the displacement map data is obtained based on the reference locations e.g. whether it is used to provide displacement map data on a tile by tile basis etc. In tile based embodiments, displacement data obtained for multiple reference locations may be used to obtained one or more displacement value in respect of a tile. Where the one or more locations do correspond to ones of the reference locations of the earlier embodiment, it should be understood that they need not necessarily correspond to all of the reference locations. Thus, the displacement map data may be only a (relevant portion) of the entire displacement map data. Likewise, the digital map data used in accordance with the invention is in respect of geographic area, and may form part of a larger digital map e.g. such that only that data in the vicinity of the location of interest is considered.

The method may comprise using the displacement map data to determine data indicative of an expected change in the absolute position of the location of interest (or an position of an object in map compilation embodiments) between times of interest e.g. between a current time and a time at which the map was generated (or a map epoch time) or sensor data was acquired, depending upon the context of the invention. The data indicative of the expected change in position of the location of interest between the times of interest may be referred to as displacement data, and may be e.g. a displacement value. The times of interest may be referred to as "epochs" e.g. acquisition epoch, generation epoch etc. An epoch refers to a specific point in time, which provides a reference point in time.

The method may comprise using a current time and data indicative of the position of the location of interest (or the position of the object) to obtain such data using the displacement map data. The position of the location of interest may be a position with respect to either reference frame, depending upon when the adjustment based on displacement data occurs. For example, the adjustment may occur after transformation of the position from the first to the second reference frame in some embodiments, although typically the adjustment occurs while the position is in the first reference frame. In practice, as displacement data does not vary significantly over small distances, small discrepancies between the position in different reference frames will not be of significance. Where the first and second reference frames are both defined by a digital map, the position of the location of interest will be defined by the first reference frame. In some embodiments, in which displacement data e.g. a displacement value is associated with a map tile covering the location of interest, the method may comprise using the data indicative of the position of the location of interest to obtain the displacement data associated with a map tile covering the location of interest. The data indicative of the change in absolute position may be in terms of the first or second reference frame, or indeed, another reference frame e.g. a fixed reference frame with respect to the Earth's surface if different.

The method may comprise using data indicative of the change in absolute position (i.e. displacement data) in respect of one or more of the locations (e.g. reference locations) in determining the data indicative of the expected change in absolute position of the location of interest between times of interest e.g. a displacement value. For example, the data e.g. displacement value may be obtained by an interpolation process based on the displacement data in respect of one or more, and optionally a plurality of locations for which displacement data is provided e.g. reference locations.

The data indicative of the change in the position of a location (e.g. reference location) over time may comprise a set of one or more displacement vectors, each displacement vector being indicative of a change in the position of the reference location between different times.

Determining displacement map data relating to displacement occurring between times of interest may be achieved in any desired manner. The displacement map data may comprise, for each one of a plurality of reference locations, data indicative of a displacement of the reference location between a reference time and one or more subsequent times. The reference time and one of the subsequent times may correspond to the times of interest. For example, the reference time may be a time of generation of the digitalmap for which adjustment is required or a time of acquisition of sensor data, in embodiments relating to compilation of a map. Alternatively the method may comprise deriving data from the displacement map data in respect of a time or times of interest. This may involve some form of inference from data in respect of different times present in the displacement map data or using a reference time where provided.

In embodiments the data indicative of the change in position of each location over time comprises data indicative of a speed e.g. velocity of the location e.g. reference location. The method may comprise using the speed e.g. velocity of the locations e.g. reference locations in determining displacement data for a location of interest.

In embodiments in which a set of reference locations of the displacement map data correspond to vertices of a set of triangles covering a geographic area, the method may comprise identifying a one of the triangles covering the location of interest. A location of interest may be considered to be covered by a triangle when it lies on or within the perimeter of the triangle. The method may comprise, for a location of interest covered by one of the triangles, and which does not correspond to one of the reference locations, using the data indicative of the change in position of the reference locations defining the vertices of the triangle to estimate data indicative of an expected change in position of the location. Such methods may be performed using interpolation. For example, such a method may be performed by interpolation using Barycentric coordinates to estimate the change in position.

In some embodiments, it is envisaged that the displacement map data may be provided as a displacement map data layer associated with a digital map. The digital map may be divided into a plurality of map tiles. In some embodiments each map tile is associated with a displacement data applicable to any location of interest within the area of the map tile. The method may then comprise obtaining the displacement data associated with the map tile and using the displacement data to provide data indicative of the expected change in position of the location of interest. Where displacement data in respect of different times is associated with the map tile, the method may comprise obtaining the displacement data in respect of the applicable time.

In yet other embodiments involving map tiles, and in which reference locations of the displacement map data correspond to vertices of a set of triangles covering a geographic area, each map tile may be associated with data indicative of one or more triangles at least partially covered by the map tile. The data may be any suitable reference to the triangle(s). The method may then comprise obtaining the triangle data and using the data to obtain displacement data for the location of interest as described above.

Any of the above features involved in the obtaining of displacement data in respect of a location of interest apply equally in respect of obtaining displacement data in respect of a position of an object in those aspects relating to map compilation.

As described above, he term "absolute position" as used herein, refers to a real world position with respect to the Earth's surface, e.g. as defined by a fixed reference frame defined with respect to the Earth's surface. The reference frame may be defined by a fixed coordinate system.

Any step of obtaining digital map data or displacement map data referred to herein may comprise accessing the digital map data from locally stored data, or in preferred embodiments the method comprises obtaining the digital map data or displacement map data from a server.

However the digital map and displacement map data are obtained, the displacement map data may be provided as a separate digital map data to the digital map comprising the location of interest, or may be provided as a map layer thereof. In some embodiments the method comprises receiving digital map data from a server, the digital map data comprising the digital map data and the displacement map data, optionally wherein the displacement map data forms a layer of the digital map data.

The digital map data may be indicative of a complete digital map covering a geographic region, or may be in the form of a tile. The map tile forms part of a larger map which has been sub-divided into a plurality of tiles. This may facilitate processing, as only the tile or tiles of relevance e.g. based upon current or other position of interest e.g. of a device that is to use the tiles. The geographic area may thus be a sub-region of a geographic region covered by the digital map.

It will be seen that the displacement map data described herein provides a representation of displacements, e.g. due to tectonic movement, that can be (and preferably is) maintained and updated separately from the rest of the map information.

In this way the useful life cycle of the digital map can be increased. For instance, it will be appreciated that considerable resource must be invested into developing an accurate digital map, and attempting to update the digital map on a more regular basis would generally be undesirable. By contrast, by using a displacement map to account for such absolute displacements means that only the displacement map (layer) needs to be produced and delivered frequently.

The techniques presented herein may generally be used in any context where it is desired to provide an accurate localisation of a vehicle within a road network and/or to generate an accurate map including information regarding the local environment of the road network. Embodiments, however, relate particularly to techniques for localising autonomous vehicles, e.g. vehicles requiring minimal tor no) driver interaction. For instance, in embodiments, the result of the localisation may be provided to an autonomous driving module of the vehicle for the purposes of navigation and motion planning. i.e. automatic driving. Thus, the vehicle may comprise an autonomous vehicle, e.g. an autonomous car or truck, etc., that is travelling through a road network. However, it will be appreciated that the present techniques may also find utility in various other contexts, e.g. relating to non- or semi-autonomous vehicles. For example, it is also contemplated that the localisation may generally be used as part of any suitable advanced driver-assistance system, e.g. where an accurate localisation of the vehicle within the map is desirable. Also, it will be appreciated that the mapping result need not (although preferably will be) used for the purposes of facilitating autonomous driving, and may be used for generating improved maps for navigation for use as desired by any vehicles, e.g. as part of a conventional navigation guidance system.

The road network is generally a network comprising a plurality of interconnected roads that are navigable by a vehicle. The road network may generally be represented by a digital, or electronic, map (or mathematical graph). In its simplest form, a digital map is effectively a database containing data representative of nodes, most commonly representative of road intersections, and lines between those nodes representing the roads between those intersections. In more detailed digital maps, lines may be divided into segments defined by a start node and end node. These nodes may be "real" in that they represent a road intersection at which a minimum of three lines or segments intersect, or they may be "artificial" in that they are provided as anchors for segments not being defined at one or both ends by a real node to provide, among other things, shape information for a particular stretch of road or a means of identifying the position along a road at which some characteristic of that road changes, e.g. a speed limit. In practically all modern digital maps, nodes and segments are further defined by various attributes which are again represented by data in the database. For example, each node will typically have geographical coordinates to define its real-world position, e.g. latitude and longitude. Nodes will also typically have manoeuvre data associated therewith, which indicate whether it is possible, at an intersection, to move from one road to another. For the purposes of conventional navigation guidance, e.g. as may be provided by a known portable navigation device, the segments of the digital map need only (and typically will only) contain information regarding the road centrelines, although each road segment may also be supplemented with attributes such as the maximum speed permitted, the lane size, number of lanes, whether there is a divider in-between, etc. However, according to embodiments of the present invention, as will be described further below, an digital map may be generated (or used) that provides a more accurate and realistic representation of the roadway profile including lane centrelines and lane connectivity (i.e. lane markings), as well as other key elements e.g. such as three-dimensional geometries of the road network such as landmark objects that may be desirably incorporated into the map. This type of digital map may be referred to as a "HD" map (compared to a conventional "SD" map containing the road centrelines but not the lane centrelines). The additional information contained in the HD map, and at least the lane markings, is generally required for the purposes of autonomous driving.

However, the use of these HD maps is not limited to autonomous vehicles, and these maps may also find suitable application in any other application where it is desired to provide an improved and more accurate representation of the roadway profile, including, but not limited to, various advanced driver-assistance system applications. Thus, the HD map may also contain data representative of any other features that may suitably and desirably be presented to a user, or to an autonomous driving system, or other advanced driver assistance system (ADAS).

The various functions of the technology described herein can be carried out in any desired and suitable manner. For example, the steps and functions of the technology described herein can be implemented in hardware or software, as desired. Thus, for example, unless otherwise indicated, the various processors, functional elements, stages, and "means" of the techniques described herein may comprise any suitable processor or processors, controller or controllers, functional units, circuitry, processing logic, microprocessor arrangements, etc., that are operable to perform the various steps or functions, etc., such as appropriately dedicated hardware elements (processing circuitry) and/or programmable hardware elements (processing circuitry) that can be programmed to operate in the desired manner. For example, the means for carrying out any of the steps of the method according to any of the aspects or embodiments described herein may generally comprise a set of one or more processors (or processing circuitry) configured, e.g. programmed with a set of computer readable instructions, for doing so. A given step may be carried out using the same or a different set of processors to any other step. Any given step may be carried out using a combination of sets of processors. The system may further comprise data storage means, such as computer memory, for storing, for example, the at least one repository including the instructive and informative data. Any of the methods in accordance with the present invention may be implemented at least partially using software, e.g. computer programs. The present invention thus also extends to a computer program product comprising computer readable instructions executable to perform, or to cause a system and/or server to perform a method according to any of the aspects or embodiments of the invention. Thus, the present invention extends to a, preferably non-transitory, computer program product comprising computer readable instructions executable when run on a system in accordance with any of the embodiments of the invention to cause a set of one or processors of the system to perform the steps of any of the aspects or embodiments of the method described herein.

It should be noted that references to an object, a feature, an area, etc. associated with, etc., a tile, or tile data structure, herein should be understood to refer to data indicative of these unless the context demands otherwise. The data may be in any way indicative of the relevant item, and may be directly or indirectly indicative thereof. Thus any reference to an object, a feature, an area, a tile, etc., may be replaced by a reference to data indicative thereof. It should also be noted that the phrase "associated therewith" or "indicative of" should not be interpreted to require any particular restriction on data storage locations. The phrase only requires that the features are identifiably related.

The present invention may be implemented in relation to navigable networks comprising navigable elements of any type, and digital maps representing such networks. Preferably the navigable elements are road elements (of a road network). While exemplary embodiments refer to road elements of a road network, it will be appreciated that the invention is applicable to any form of navigable element, and digital maps representing such elements, including elements of a path, river, canal, cycle path, tow path, railway line, or the like. For ease of reference these are commonly referred to as a road element of a road network.

Various features of embodiments of the invention will be described in further detail below.

BRIEF DESCRIPTION OF THE DRAWINGS

Various embodiments of the technology described herein will now be described by way of example only and with reference to the accompanying drawings, in which.

Like reference signs will be used for like elements in the drawings, as appropriate.

DESCRIPTION

The present disclosure generally relates to providing improved technologies for processing location data. In particular, preferred embodiments relate to methods of processing location data that is to be used for advanced/autonomous driving applications. However, it will be appreciated that the technology described herein is not limited to such applications. Thus, whilst various embodiments will now be described with reference to advanced/autonomous driving applications it will be understood that the present disclosure is not so limited and may also find utility in various other applications where highly accurate map functionality may be desired.

Advanced driving applications in vehicles need to determine and maintain their position in the real world accurately and reliably. This process, commonly referred to as "localization", relies on one or more localization modules. As described above, localization is usually performed using a variety of techniques. For instance, GPS measurements are used to provide a position of the vehicle that can then be matched onto a digital map. In order to more reliably determine the location of the vehicle within the map and also to determine the orientation of the vehicle, sensor data particularly in the form of image data acquired by the vehicle is also used. Typically sensor data indicative of objects in the vicinity of the vehicle is acquired, and the objects then matched to map objects. This process is known as "map matching". In this way, the locations of the map objects may be determined using the map data, and used in determining a real-world position of the vehicle.

Such localisation techniques therefore rely on highly accurate map data. Generating a digital map is an expensive and complex process, in terms of time and cost. A digital map is typically compiled using various sources of data, including sensor data obtained from mobile mapping vehicles, navigation applications, aerial data, crowd sourced data, web data, etc. In view of this, it is not practical or economic to update a digital map on a frequent basis. However, as mentioned above, crustal dynamics will cause the absolute position of geospatial features to change over time. This means that over time, the digital map data will cease to accurately represent the real-world positions of objects. This can therefore introduce errors or inconsistencies into map matching processes using the digital map data, with potentially serious (e.g. fatal) consequences when this information is being relied upon for advanced/autonomous driving purposes.

Figure 1:
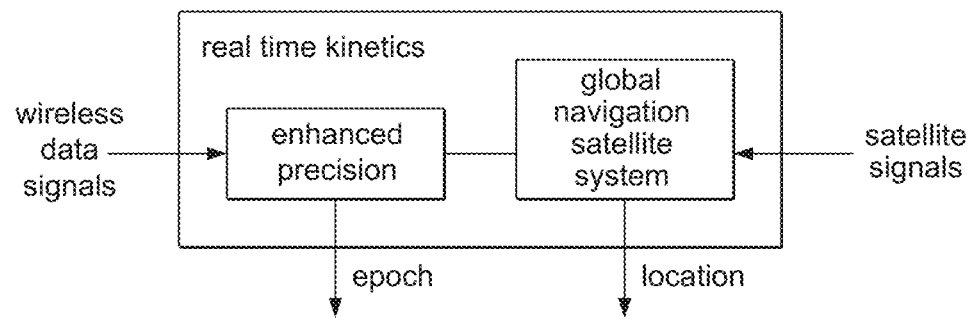
FIG. 1 illustrates a localisation module for determining an absolute position of a device from a global navigation satellite system (GNSS)
Figure 2:
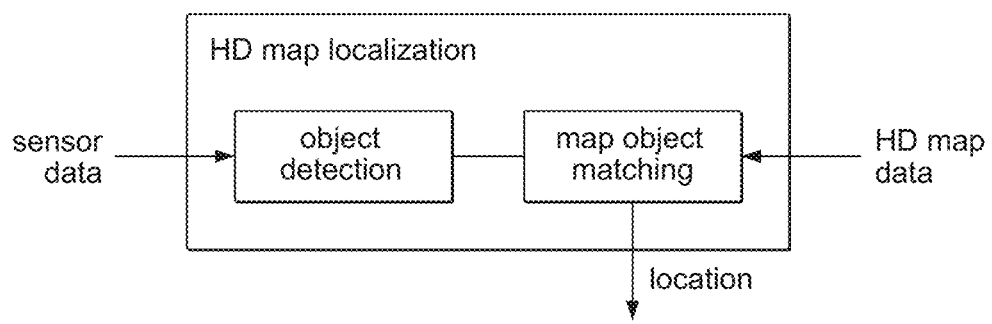
FIG. 2 illustrates a localisation module for determining a relative position of a device within a digital map.
Figure 3:
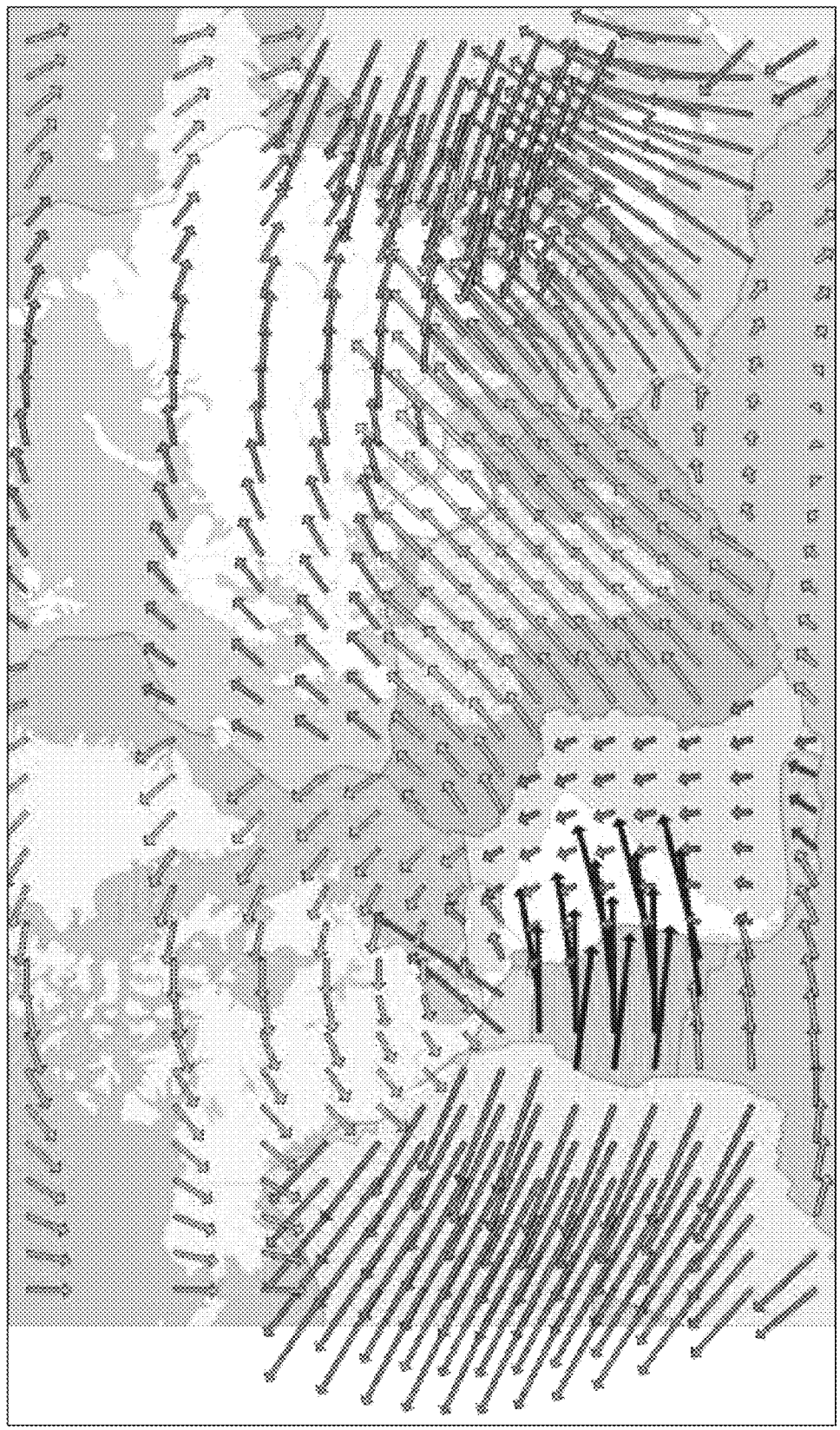
FIG. 3 illustrates tectonic shifts on a global map.

Localization does therefore have to consider crustal dynamics for its accuracy to be sustainable. Tectonic plate movements are a major contributor to crustal dynamics and are associated with both slow stationary displacements distant from the plate boundaries (e.g. 62-70 mm/year for the Australian plate. and sudden (sometimes larger) displacements at transform plate boundaries. The latter is typically associated with earthquakes. FIG. 3 below shows crustal movements on a global map.

FIG. 3 shows a map of the earth showing the land and sea mass and the tectonic plates in the crust of the earth. Each of the tectonic plates has their own movement with varying speed and direction as indicated in the figure. At the tectonic plate boundaries, the plates collide and deform often associated with earthquakes and other crustal dynamics phenomena. The figure shows the Australian plate (bottom right) with large North-North-East (NNE) displacements. Even with the somewhat smaller displacements in the northern hemisphere, the annual displacements may be of the same order of magnitude as the required location accuracy.

Localization methods based on HD map data (see description above) determine a location of e.g. of a vehicle, based on the location of map objects i.e. object descriptions in the HD map information. The map objects used may be map objects to which objects detected by vehicle systems in the vicinity of the vehicle have been matched. Due to the shifts of the tectonic plates and associated crust dynamics, the positions of the map objects in the HD map information will not accurately reflect reality over time unless the effects of crustal dynamics are taken into account. If the effects of crustal dynamics are not accounted for, the ability to reliably match detected objects to map objects will be lost over time. This is demonstrated in FIG. 4.

Figure 4:
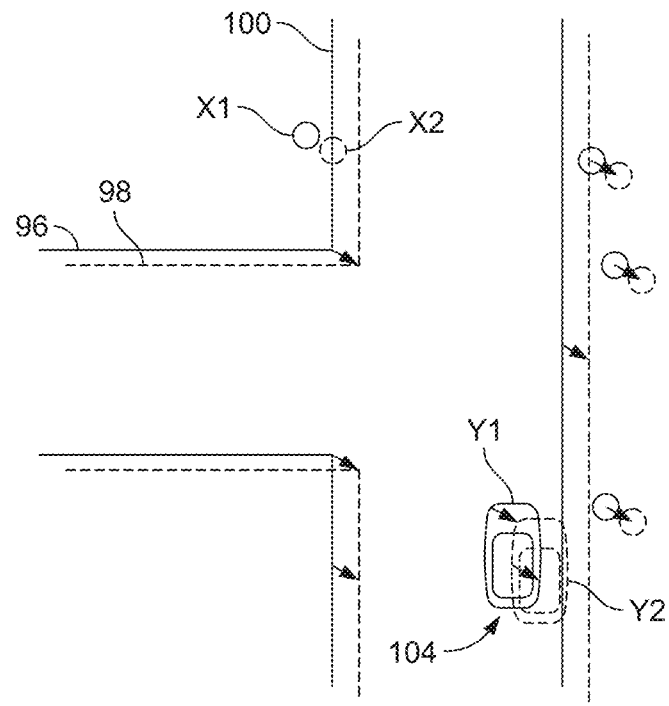
FIG. 4 shows the effect of such tectonic shifts on digital map data.

FIG. 4 illustrates a portion an HD digital map representing a portion of a road network, in a vicinity of a junction between road segments, and being traversed by a vehicle 104. The map information at the time of generation of the map (in this exemplary embodiment defining a "map epoch" $e_{map}$) is in solid lines 96.

The updated map information at a later time, at which localization is performed, referred to as the localization epoch $e_{loc}$, is shown in dotted lines 98. Here it may be seen that the map information has shifted as a result of crustal dynamics. For example, the position X1 on the road segment 100 has shifted to position X2. The position Y1 of vehicle 104 has shifted to position Y2. Thus, if the map data is not updated to compensate for crustal dynamics, by shifting the map data from the solid line data to the dotted line data as illustrated, an attempt to map match an object detected at X2 at the localization time may fail, as, according to the map data, the object is at position X1. Failure to account for the effects of crustal dynamics may therefore create conflicts between HD map localization and other (different) localization technologies, and may create conflicts between HD map information and outputs from other different localization technologies.

One approach to compensate for crustal dynamics, and provide updated map information as shown in FIG. 4, would be to reproduce and deliver the whole map on a regular basis, e.g. once every one or two months. However, the incurred production and delivery cost would be unacceptable or at least be undesirable.

Some exemplary embodiments of the invention will now be described.

The HD map information is generated from geospatial sensor data and high accuracy location information. For example, the geospatial sensor data may be obtained using Mobile Mapping vehicles equipped with LIDAR sensors, 360 degrees cameras and similar geospatial sensors. In this example, the Mobile Mapping vehicle comprises one or more advanced and accurate location sensors that associate accurate location information with the sensor data. In addition, an acquisition epoch $e_{acq}$ is associated with the sensor data. A map compiler uses the sensor data, the associated location data and acquisition epoch data to generate HD map information.

During HD map production, the HD map information may be associated with a common map epoch $e_{map}$. A map epoch is a reference time, such that the map represents the situation at that time. In some embodiments of the invention, the map epoch is typically a standard time, selected such that multiple maps may share the same epoch, i.e. a common map epoch. Thus, while sensor data is obtained in respect of a particular moment in time, the acquisition epoch, when compiling the map, the sensor data is typically adjusted i.e. shifted back in time, such that the resulting map reflects the situation at an earlier map epoch. This may be performed, at least in part, by mobile mapping vehicles. Thus, the compiler may set a map epoch, which corresponds to a desired, earlier map epoch. The map epoch may therefore not necessarily correspond to the actual time of generation of the map as in the exemplary embodiment of FIG. 4.

Figure 5:
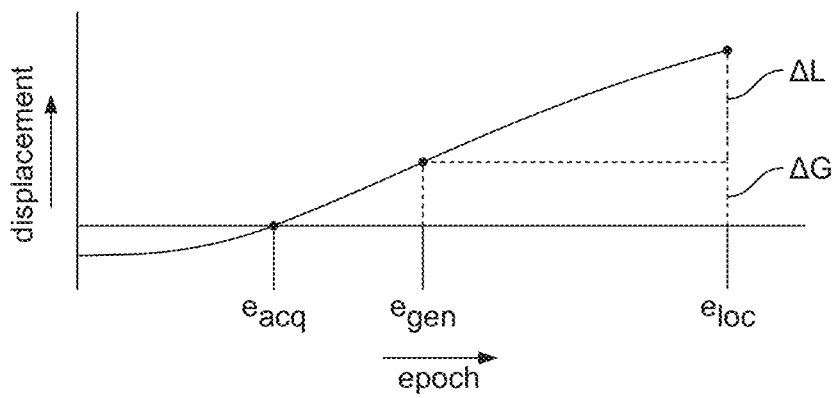
FIG. 5 shows the displacement of the position of a location as a function of time (epoch) due to crustal dynamics.

A vehicle uses the HD map information for localization at a localization epoch $e_{loc}$. The localization epoch, map epoch and acquisition epoch typically are all different. FIG. 5 shows the displacement vector d for a location p as a function of the epoch e.

FIG. 5 shows the displacement d due to crustal dynamics for the position of a location p as a function of epoch e (time). The displacement d at a given epoch e i.e. time is the difference between the position i.e. coordinates of the location p at the epoch e and the position i.e. coordinates of the location p at a reference epoch. In the figure the reference epoch is $e_{acq}$, but this may be a different epoch. In the Figure, the displacement between $e_{acq}$ and $e_{map}$ is $\Delta G$, while the displacement between $e_{map}$ and $e_{loc}$ is $\Delta L$.

FIG. 5 also shows the previously introduced epochs ($e_{acq}$, $e_{map}$, $e_{loc}$) and the displacement values for the position the location p at these epochs. The figure shows the displacement d as a one dimensional value. In practice, the displacement vector is a two or three dimensional vector.

According to the present embodiment a displacement map is provided that can be maintained and updated independently of the HD map information. This displacement map enables the position of a location to be adjusted to compensate for the effects of crustal dynamics, when using the HD map information. Thus, the displacement map enables such effects to be taken into account, without the need to update the entire HD map. The displacement map may, in practice, be integrated with the HD map as a displacement map layer. However, the displacement map could alternatively be provided as a separate map.

Displacement Determination

Certain exemplary methods which may be used to generate the displacement map will now be described.

The displacement of any location p is determined based on position information for a number of reference locations. These reference locations (reference points) are selected to form an irregular triangular network covering the map area of interest (or the entire globe). The reference locations can be any points for which accurate displacements can be measured or modelled. Typically, these will be locations with permanent GNSS receivers installed, such as the Continuously Operating Reference Stations (CORS) in the US, or those operated by RTK (Real Time Kinetics) service providers as shown in FIG. 6A.

Figure 6A:
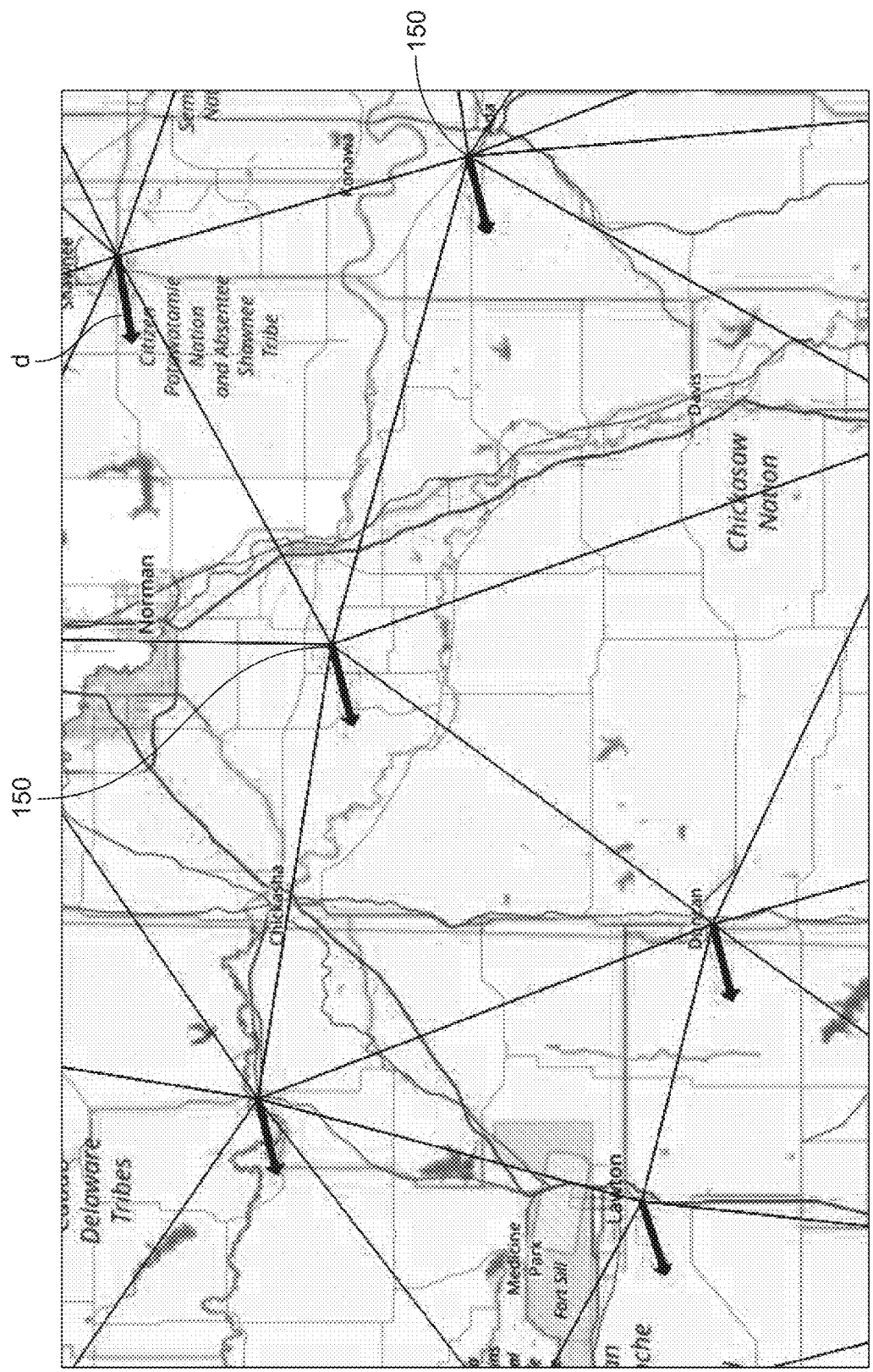
FIG. 6A shows a network of reference locations, each with a displacement vector for a given epoch.

FIG. 6A shows a network of reference locations 150 with a displacement d, in the form of a vector, for a given time i.e. epoch e. The reference location 150 define the vertices of triangles e.g. triangles 152, 154, 156 etc. The displacement indicates the change in position of the location between first and second times, or epochs, corresponding to a reference epoch e.g. a map epoch, and a subsequent epoch e. The epoch e may be any epoch of interest, such as a current or localization time. The density of the reference locations in the network may be less (i.e. so as to define large triangles) in areas with little crustal activity, e.g. in the centre of large tectonic plates, and greater (e.g. so as to define smaller triangles) in areas where the crust is more active, e.g. at plate boundaries.

Figure 6B:
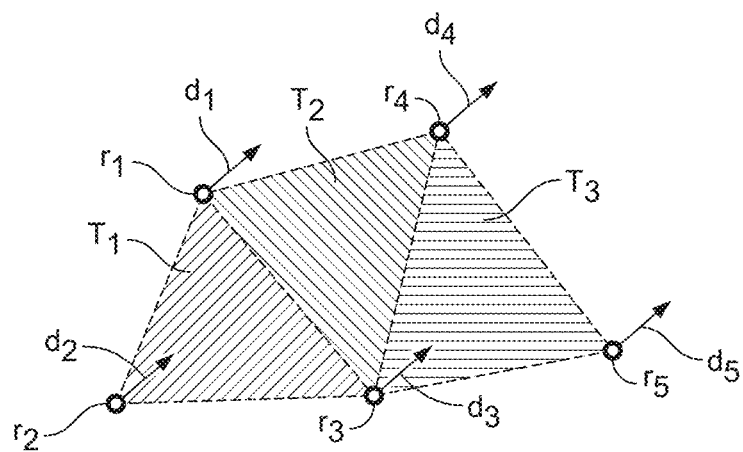
FIG. 6B shows five reference locations with respective displacements at an epoch e.

FIG. 6B shows five reference locations r ($r_1$, $r_2$, $r_3$, $r_4$, $r_5$) each with a displacement d ($d_1$, $d_2$, $d_3$, $d_4$, $d_5$) for the epoch e. The five reference locations form three triangles T ($T_1$, $T_2$, $T_3$) with reference locations as vertices. In the figure, triangle $T_1$ is formed by the reference locations ($r_1$, $r_2$, $r_3$), $T_2$ by ($r_1$, $r_3$, $r_4$) and $T_3$ by ($r_4$, $r_3$, $r_5$). At an epoch e, the reference location r has a displacement d relative to the location of r at a reference epoch $e_0$. This can be captured by storing tuples (r, d, e), $e_0$ and the coordinates of r at $e_0$. Alternatively, the displacements for a reference location r at $e_0$ can be described by tuples (d, e). Similarly, the displacements can be tracked by tuple (r, R, e) where R is the actual location of reference location r at epoch e. All these variants enable generating the displacement d for a reference location r at an epoch e. The displacement values are given relative to any suitable reference framework, such as the International Terrestrial Reference Frame.

For each reference location $r_i$ in the set RL of N reference locations RL={$r_i$|i=0 . . . N}, it is possible to determine a set $P_i$ of K tuples $P_i$={(i, $d_j$, $e_j$)|j=1 . . . K} that tracks the displacement of the reference location due to crustal dynamics. In order to determine the displacement d at the epoch e for the reference location r, the set $P_i$ is searched for a tuple in which $e_j$ equals e and the corresponding displacement $d_j$ then forms the determined displacement d. If there is no matching value for e in the tuples of $P_i$, the two closest epochs $e_a$ and $e_b$ are obtained from the set (so, $e_a$<e<$e_b$ and there is no epoch $e_j$ in $P_i$ that falls between epochs $e_b$ and $e_a$). The displacement d for reference location r then can be interpolated, e.g. using $$d = d_a + (e - e_a)\left(\frac{d_b - d_a}{e_b - e_a}\right).\qquad\text{equation 1}$$

Other interpolation techniques (e.g. higher order polynomials, splines) also may be used. The determination of the displacement d at the epoch e for the reference location r, can be adapted for different data formats for recording displacements of reference locations at different epochs.

Figure 7:
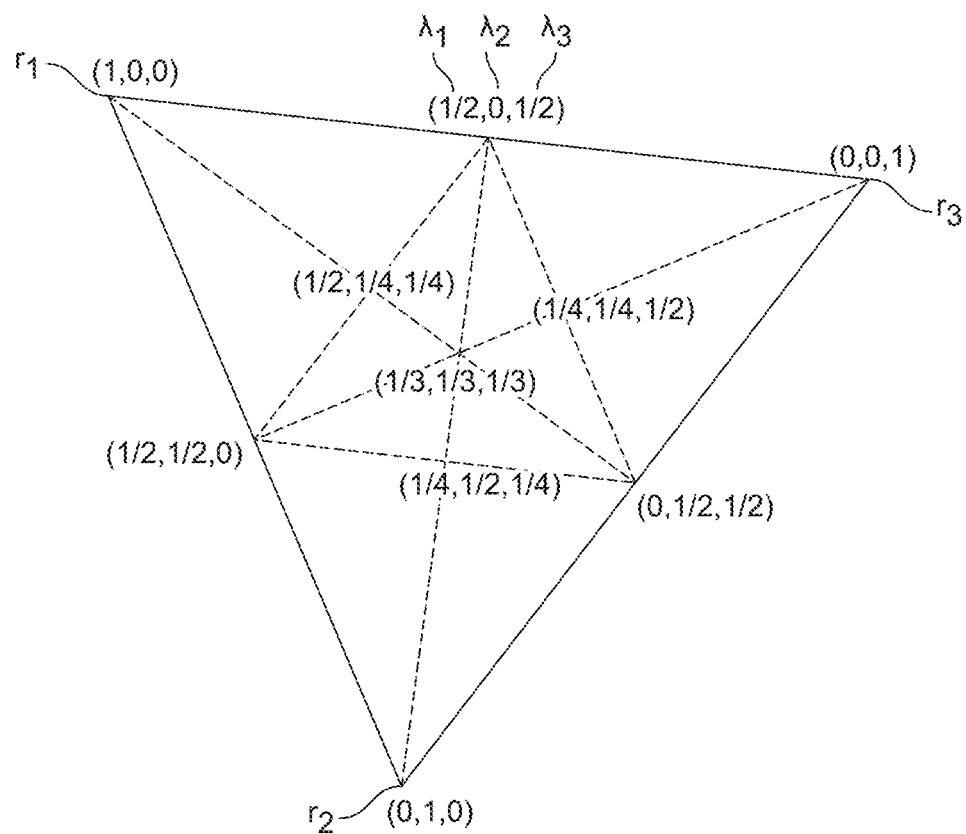
FIG. 7 illustrates techniques which may be used to determine a displacement at a point in a triangle with vertices corresponding to reference locations.

The displacement of reference locations can be used to estimate a displacement at a general location (i.e. the change in position of the location between epochs) relative to a triangle of reference locations. FIG. 7 shows the use of Barycentric coordinates to estimate (using interpolation) the displacement of locations within the triangle of reference locations.

The displacement at any point in the triangle is a linear combination of the displacements at the vertices. E.g. the displacement value at the middle of the top edge is ½ times the value at the top left vertex, 0 times the value at the bottom vertex and ½ times the value at the top right vertex.

Each location in the triangle with vertices ($r_1$, $r_2$, $r_3$) can be expressed as a tuple ($\lambda_1$, $\lambda_2$, $\lambda_3$) with 0<$\lambda_i$<1 and $\lambda_1$+$\lambda_2$+$\lambda_3$=1 as shown in FIG. 7. A point at the middle of the top edge can be expressed as (0.5, 0, 0.5). The displacement for a location then can be calculated using the displacement vector for each of the vertices and the barycentric coordinates of the location using $\lambda_1$*$d_1$+$\lambda_2$*$d_2$+$\lambda_3$*$d_3$. As a HD map location p may be encoded in a different coordinate system, the HD map location p may need conversion to the barycentric coordinates for the triangle containing the location p. Techniques which may be used to provide such conversions are known in the art. After the conversion, the barycentric coordinates and the displacements at the vertices (defined by the three reference locations) enable determination of the tuple (d, p, e) comprising the interpolated displacement d for the HD map location p at the epoch e. The coordinate conversion also can be used to determine if the HD map location p is within the area of the triangle as all barycentric coordinates ($\lambda_1$, $\lambda_2$, $\lambda_3$) for locations inside the triangle have the property (0<$\lambda_4$<1 for all i=1, 2, 3).

HD Map Generation—Compensating for Displacement Since Sensor Data Acquisition Epoch)

In some exemplary embodiments, the invention may provide a map compiler that uses the acquisition epoch $e_{acq}$ associated with sensor data collected for HD map creation and that acquires displacement information representing crustal dynamics between the acquisition epoch and a map epoch $e_{map}$ to adjust the coordinates of the HD map objects to the HD map epoch $e_{map}$. The HD map compiler thus generates HD map information that represents the coordinates of HD map objects and HD map location at the map epoch $e_{map}$. This method of map generation compensates for crustal dynamics during the different acquisition epochs associated with sensor data collected for HD map creation and the generation epoch associated with the compiled/generated HD map information.

Figure 8:
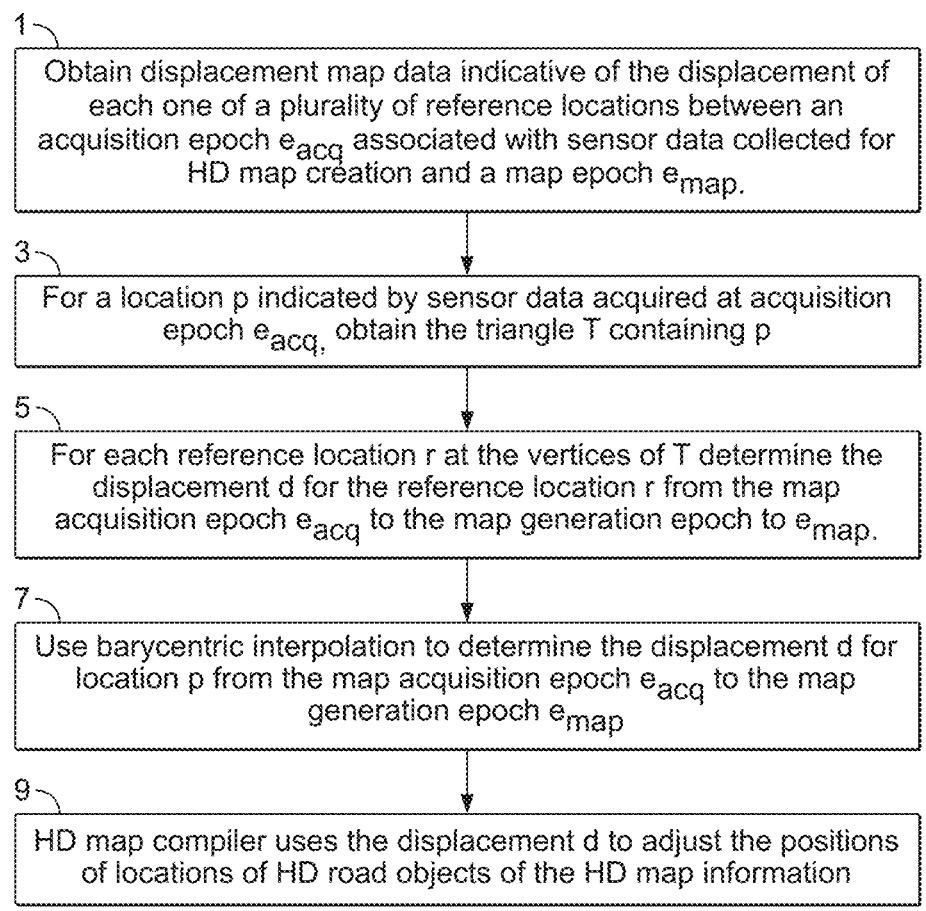
FIG. 8 is a flow chart illustrating one embodiment of a method for determining a displacement at a location p using displacement map data in respect of reference locations corresponding to the vertices of triangles, and using such data in compiling a map.

Referring to FIG. 8, in step 1, the method comprises obtaining displacement map data indicative of the displacement (i.e. the change in position) of each one of a plurality of reference locations between an acquisition epoch $e_{acq}$ associated with sensor data collected for HD map creation and a map epoch $e_{map}$. In this example, the map epoch corresponds to the map generation epoch, rather than an earlier reference epoch, although such arrangements may be envisaged as described below. In this example, the reference locations define the vertices of a set of triangles, in the manner illustrated in FIG. 6B.

The HD map compiler uses sensor data for a location p obtained at an acquisition epoch $e_{acq}$ to generate HD map object data for the location p at the map epoch $e_{map}$. The displacement d for a location p from the map acquisition epoch $e_{acq}$ to the map generation epoch to $e_{map}$ may be determined as follows.

In step 3, for location p, obtain the triangle T containing p. For each reference location r at the vertices of T determine the displacement d (i.e. the change in position) for the reference location r from the map acquisition epoch $e_{acq}$ to the map generation epoch to $e_{map}$ (step 5). The barycentric interpolation (described above) can then be used to determine the displacement d for location p from the map acquisition epoch $e_{acq}$ to the map generation epoch $e_{map}$ (step 7). In step 9 the HD map compiler uses this displacement d to adjust the positions of locations of HD road objects of the HD map information. This may involve shifting the coordinates or, in the general, the locations of the road objects, which may be defined by extended locations, rather than point locations.

The HD map compiler thus can correct the HD map information to correct absolute coordinates associated at the map generation epoch $e_{map}$. This method can adjust for differences in sensor data acquisition epochs used for generating the HD map information.

In a variant, the sensor data may determine its location relative to a reference location (e.g. an RTK station) and then adjust the location associated with the sensor data to the position of the reference location at a map epoch $e_{map}$. This may be performed e.g. by a mobile mapping vehicle. In these embodiments, the map epoch may be an earlier reference time, rather than the time of generation of the map. This simplifies map generation as all sensor data is associated with a location at a reference map epoch. The compiler is not then required to shift any sensor data to compensate for displacement between the data being acquired and the time of generation of the map. The adjusted sensor data may simply be used to provide a map reflecting the situation at the reference time, corresponding to the map epoch $e_{map}$.

It will be appreciated e.g. as illustrated in the examples above, that the map epoch may or may not correspond to the actual time of map generation, as, when a map is generated, sensor data, or other data used in compiling the map, may be adjusted so as to reflect the situation at the reference time. This may enable multiple maps to be generated sharing the same epoch, helping to ensure compatibility between the maps, and facilitating use of the displacement maps of the present invention. This may be achieved e.g. by shifting sensor data obtained by mapping vehicles back in time, to a desired standard map epoch. It is further noted that the map epoch need not necessarily be a common value for the entire map. Thus references herein to a map epoch, or map generation time, refer to the relevant epoch or time in respect of at least the portion of the map being considered i.e. the portion covering the location of interest.

Displacement Map Generation—Displacement Since Map Epoch

It is desirable for HD map information to remain unchanged for relatively long periods of time as this reduces map generation and map distribution resources. Preferably, the core HD map information remains constant for some years. As described above, if the HD map (generation) epoch $e_{map}$ and the localization epoch $e_{loc}$ are too far apart, crustal dynamics will cause inconsistencies and failures in the localization process. In the example described, the map epoch may be referred to as the map generation epoch. However, it will be appreciated that this may correspond to the actual time of generation of the map, or an earlier reference time used in generating the map as described earlier.

Frequently updating the map to a new epoch is not an attractive solution to this problem, because it involves considerable costs for generating a HD map and distributing the new version of the HD map. Instead, in some exemplary implementations of the present invention, a map server creates a separate map or a separate map layer containing displacement information. As outlined above, displacement information is indicative of the changes in positions at locations e.g. a network of reference locations which occur between different times e.g. between particular epochs of interest, as a result of crustal dynamics. The invention thus enables the HD map, which comprises a large amount of data (including geographical coordinates), to be kept in the same epoch for many years, while still being usable to perform functions, such as localization, using sensor data acquired at a later time or times. This substantially reduces map compilation and HD map distribution costs.

Various techniques which may provide the map client and the HD map applications with access to displacement map data that supports transforming the HD map from the map generation epoch $e_{map}$ to an HD map at a (later) displacement epoch $e_{dis}$ will now be described. The displacement epoch $e_{dis}$ is a more recent epoch than the map generation epoch $e_{map}$. The displacement epoch may correspond, or be close enough to any epoch of interest to which it is desired to update the HD map data in order to perform functions using the data. In the exemplary embodiments which use the HD map data in localization processes, the displacement epoch is close enough to the localization epoch $e_{loc}$ used in the vehicle, so that crustal dynamics between these two epochs is negligible.

The displacement map contains data indicative of a plurality of reference locations, which are each associated with displacement information. The nature of crustal dynamics causes displacements to be similar over large map areas. This makes it possible to establish a relatively efficient encoding of the displacement information. A displacement refers to the change in position of a location e.g. reference location, between times of interest e.g. epochs.

A first option is to use a relatively sparse network of reference locations and their displacements from the map generation epoch $e_{map}$ to the displacement epoch $e_{dis}$. As described previously, in some preferred embodiments the network of reference locations defines triangles T, with reference locations at the vertices. The triangles are tessellating triangles. Each reference location has an associated displacement (change in position) that occurred from $e_{map}$ to $e_{dis}$. The use of tessellating triangles for encoding displacements has the advantage that it is continuous at the edges between the different triangles.

As an example, reference to FIG. 6B, containing three triangles, is used. In the example the displacement map contains three triangles ($T_1$, $T_2$, $T_3$). The displacement map then contains the information: ($T_1$, $r_1$, $r_2$, $r_3$), ($T_2$, $r_1$, $r_3$, $r_4$), ($T_3$, $r_4$, $r_3$, $r_5$), ($r_1$, $d_1$), ($r_2$, $d_2$), ($r_3$, $d_3$), ($r_4$, $d_4$), ($r_5$, $d_5$), $e_{map}$, $e_{dis}$. Thus, the displacement map includes data indicative of the displacement of the vertices of the triangle T between $e_{map}$ and $e_{dis}$. It is noted that $e_{map}$ may also be associated with a triangle. However, this is only optional. $e_{dis}$ may be represented using a displacement map version number.

Figure 9:
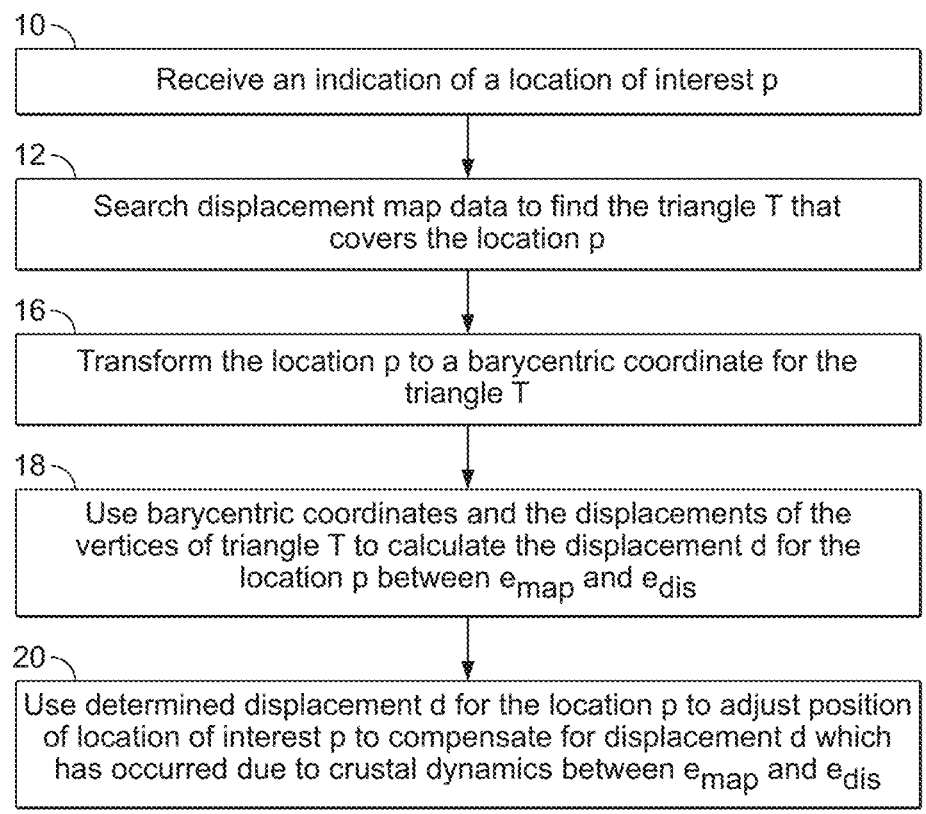
FIG. 9 is a flow chart illustrating one embodiment of a method for determining a displacement at a location p using displacement map data in respect of reference locations corresponding to the vertices of triangles, and using such data in adjusting the position of a location of interest when using digital map data.

Referring now to the flowchart of FIG. 9, in one exemplary embodiment using such data, the method comprises receiving an indication of a location of interest p—step 10. This is a location with respect to a map. In step 12 the method comprises, for the location of interest p, determining a displacement d for the location of interest p by searching the displacement map data to find the triangle T that covers the location p. In step 14 the method involves transforming the location p to a barycentric coordinate for the triangle T. The determining step may cache results of locations and matching triangles for speeding up future triangle searches. The barycentric coordinates and the displacements of the vertices of triangle T are then used to calculate the displacement d for the location p between $e_{map}$ and $e_{dis}$—step 18. As the triangles are relatively large and the displacement only varies slowly over these triangles, these steps may be done infrequently or use previous results to speed up the displacement determination for a location that is not much different from a previous location. In step 20 the determined displacement d for the location p is used to adjust the position of location of interest p to compensate for displacement d which has occurred due to crustal dynamics between $e_{map}$ and $e_{dis}$.

The displacement map can be applied both for streaming HD map delivery services, as well as delivery of HD map content on storage media or downloaded as a HD map content file. In these approaches the displacement map is a separate map that can be applied by the map application.

Displacement Speed Maps

In other embodiments, a displacement map is obtained comprising data indicative of a speed of displacement at each reference location, rather than indicative of the displacement i.e. change in position in the position of the location between different times e.g. epochs of interest.

Thus, while in the embodiments described above the displacement d is indicative of a difference in the position $p_a$ of the location at an epoch $e_a$ and a position $p_b$ of the location at an epoch $e_b$, another option is to use a displacement speed v. The displacement speed describes a linearly changing location p which may be obtained by the formula $$v = \frac{p_b - p_a}{e_b - e_a} = \frac{d}{e_b - e_a}. \quad \text{Equation 2}$$

The speed can be used to determine a displacement d' at any epoch e of interest, e.g. by using the formula: $d'=v*(e-e_a)$. This shows that the displacement can be determined at any one of a range of times i.e. epochs based on a displacement speed value for a location obtained from the displacement map, and a start epoch i.e. time. The displacement speed value may be used together with a difference between an epoch of interest e.g. a current time, and a reference start time $e_a$ (i.e. epoch), from which the displacement is desired to be determined e.g. a time (or epoch) at which the position of the location is known e.g. a map epoch. It should be clear that v may be a constant velocity or a more complex expression.

In some cases the displacement speed may be used to describe a change to a base displacement do that exists at the first epoch $e_a$ using the formula: $d'=d_0+v*(e-e_a)$.

Displacement maps including displacement speed data are useful to determine displacements for a range of epochs compared to a single epoch for a displacement map including only displacement distance data. A displacement speed map also requires knowledge of an epoch value (i.e. an epoch for which the position of a location of interest e.g. map location is desired to be determined) in addition to the position of the location e.g. map location at a given (e.g. earlier) epoch to determine the displacement for that map location.

Using the example of the displacement map of the previous section, a displacement speed map for the example can be represented as;

$(T_1, r_1, r_2, r_3), (T_2, r_1, r_3, r_4), (T_3, r_4, r_3, r_5), (r_1, v_1), (r_2, v_2), (r_3, v_3), (r_4, v_4), (r_5, v_5), e_{map}$ Using this displacement speed map information, the displacement $d_2$ for $r_2$ at $e_{dis}$ can be obtained by $d_2=v_2*(e_{dis}-e_{map})$.

Figure 10:
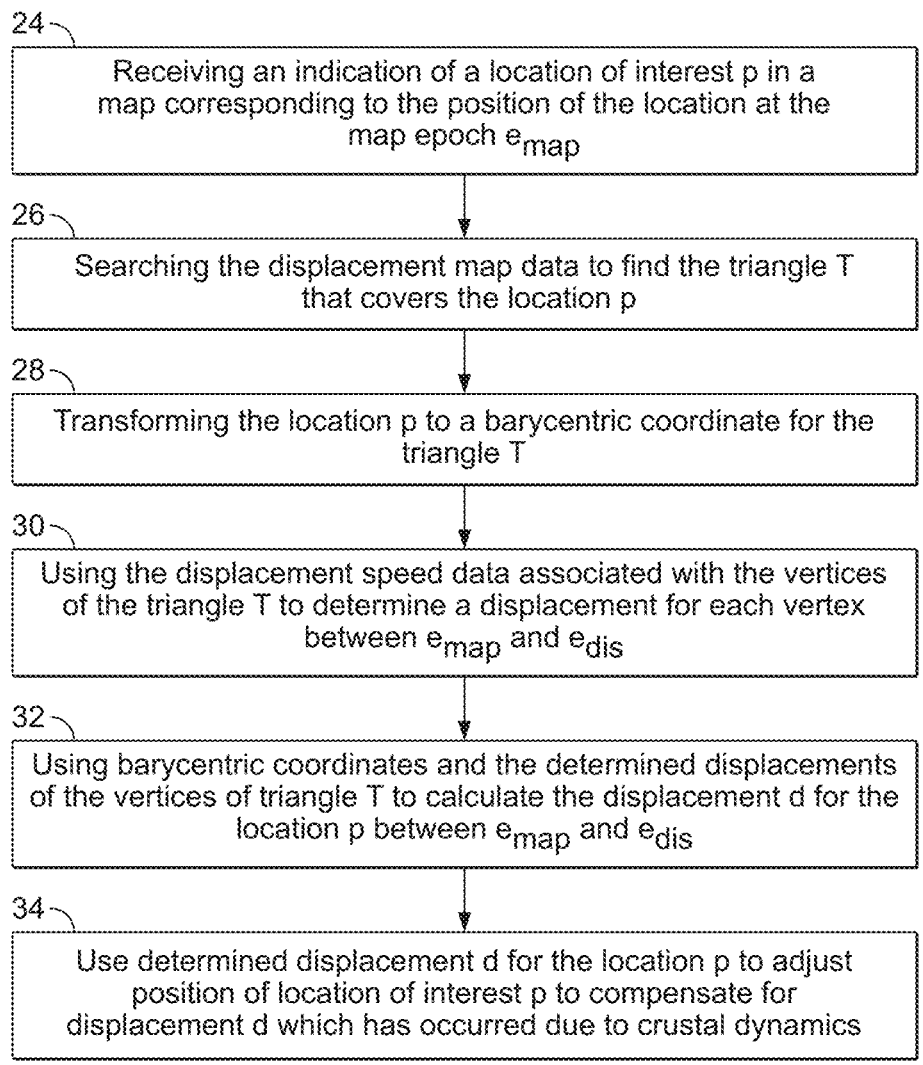
FIG. 10 is a flow chart illustrating one embodiment of a method for determining a displacement at a location p using displacement map data in respect of reference locations corresponding to the vertices of triangles, and using such data in adjusting the position of a location of interest when using digital map data, where the displacement data includes displacement speed data.

Referring to FIG. 10, a method of determining the displacement at a location of interest using displacement speed data may comprise;

Receiving an indication of a location of interest p in a map corresponding to the position of the location at the map epoch $e_{map}$—step 24

Searching the displacement map data to find the triangle T that covers the location p—step 26

Transforming the location p to a barycentric coordinate for the triangle T—step 28

Using the displacement speed data associated with the vertices of the triangle T to determine a displacement for each vertex between $e_{map}$ and $e_{dis}$—step 30;

Using barycentric coordinates and the determined displacements of the vertices of triangle T to calculate the displacement d for the location p between $e_{map}$ and $e_{dis}$—step 32

Use determined displacement d for the location p to adjust position of location of interest p to compensate for displacement d which has occurred due to crustal dynamics—step 34.

Of course, the method could be performed in other manners, e.g. by determining a displacement speed associated with each vertex to determine a displacement speed at the location p, and thus a displacement at p between the relevant times etc.

Other variants may use other interpolation techniques such as Kriging for estimating the displacement for a location as a function of epoch. It should be clear that different interpolation techniques require different parameters for determining the displacement.

Overview

The present invention provides methods of generating displacement maps and methods of adjusting location data using displacement map data. A functional diagram of one exemplary system for generating displacement map data, and adjusting location data using the displacement map data is shown in FIG. 11.

Figure 11:
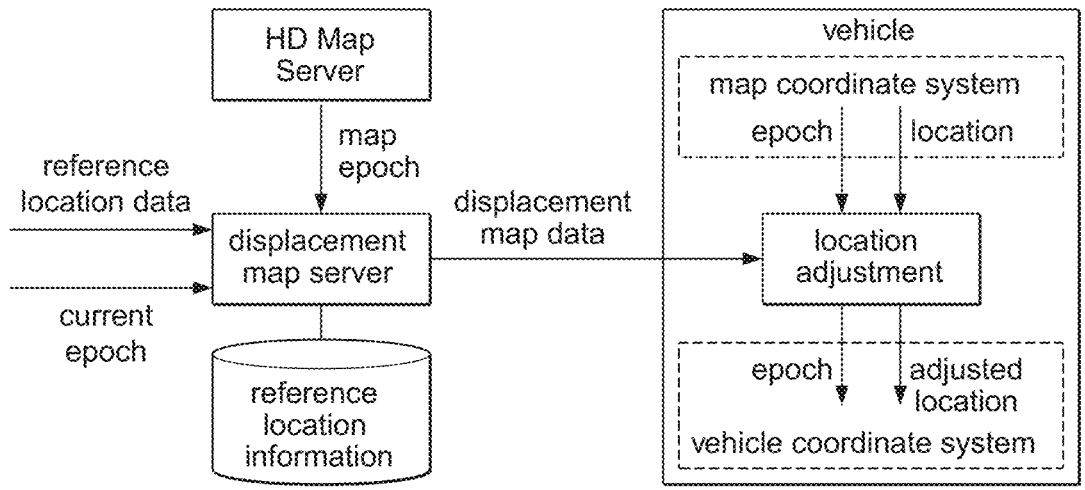
FIG. 11 shows a server infrastructure for generating displacement maps, and a vehicle environment in which the displacement map data is used.

FIG. 11 shows a server infrastructure for generating displacement maps and the vehicle environment where the displacement map data is used to adjust a map location from a map coordinate system (i.e. first reference frame) to a vehicle coordinate system (i.e. second reference frame). The location adjustment also may be applied in the reverse direction. The various implementations of the invention are presented in more detail below.

The displacement map server generates displacement map data, for example in accordance with any of the embodiments described. The displacement map data is generated based on HD map data, reference location data, and reference location information. The reference location information is indicative of the displacement of the reference locations between different times e.g. in terms of change in position or a displacement speed as described above. The different times include at least a map epoch, corresponding to a reference time associated with the map, and a current epoch i.e. current time. Thus, the displacement map data comprises displacement map data providing information indicative of the displacement of the reference locations between the map epoch and a current time. This may be achieved in various manners. For example, in one simple embodiment, the displacement map data comprises a displacement speed for each reference location, which may be used to determine the displacement of each reference location relative to the map epoch at any given time of interest i.e. current time, based on the difference between the current time, and the map epoch.

The location adjustment sub—system may transform the position of any location with respect to the map coordinate system at a given epoch (time) to a position with respect to the vehicle coordinate system at that epoch (or vice versa), in a manner which compensates for changes in the position of the location which have occurred due to crustal dynamics between the current time e.g. time of localization and the map epoch.

Localization Using Sensor Data, HD Maps and Displacement Maps

Embodiments of the invention will now be described in relation to the case in which the invention is used in determining a displacement for adjusting the position of locations for use with HD map data, in a method that comprises; acquiring a first location, using the first location to obtain displacement map data, and processing the displacement map data to generate a displacement related to the first location.

In one embodiment of the invention a method for providing an absolute localization based on vehicle sensor data and HD map data is provided. The functional diagram for the method is shown in FIG. 12.

Figure 12:
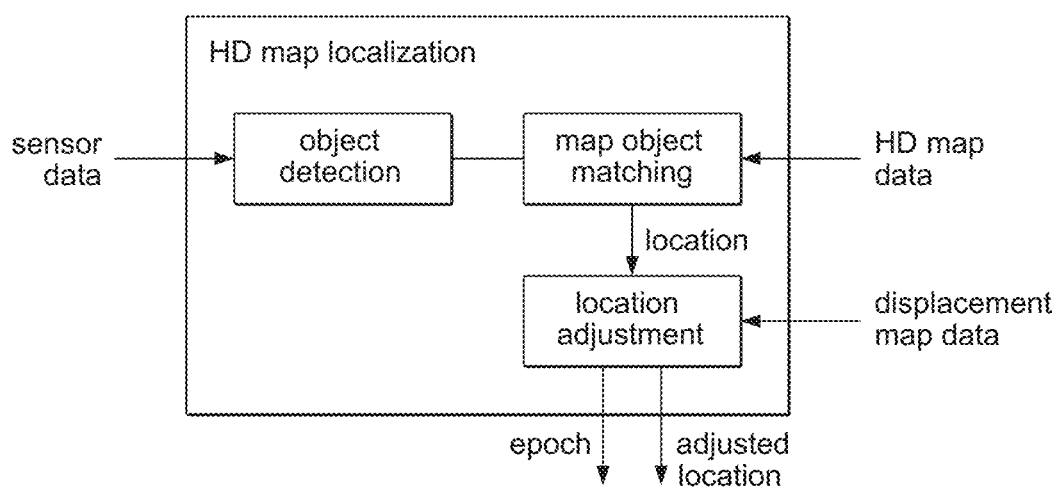
FIG. 12 shows an HD map localization module including a location adjustment sub-system in accordance with one embodiment.

FIG. 12 shows an HD map localization module with an additional location adjustment sub—system for implementing the techniques of the present invention. The location adjustment sub—system acquires displacement map data from the displacement map server.

Sensor data from sensors associated with the vehicle is received by an object detection sub—system of the localization module. In this exemplary embodiment, the object data used by the localization module is in the map reference frame (having previously been converted from the vehicle system), such that it may be used directly in the map matching process, although other arrangements may be used. The object data is provided to a map matching sub—system of the localization module. The map matching sub—system uses the detected object data and HD map data to match the detected object to a map object. This provides a map object corresponding to the detected object in the map reference frame. The position of this map object is then provided to a location adjustment sub—system. The location adjustment sub—system uses the displacement map data to adjust the determined location of the object for the effects of crustal dynamics which has occurred between the current i.e. localization time/epoch and the map epoch based on determining a displacement for the position of the object between these times/epochs. If the displacement map data does not include data for the exact current/localization epoch, then the closest epoch for which data is available will be used e.g. a most recent version of the displacement map data (which should generally approximate the current displacement to a sufficient degree, given that crustal dynamic changes tend to be relatively small with respect to time). If a displacement speed is used, then this may more easily enable a displacement for any current/localization time to be obtained and used. The adjusted location is provided to the vehicle.

In this way the location of the detected object in the vehicle reference frame is provided, which takes into account the effects of crustal dynamics. This adjusted location is the output and used in determining a position of the vehicle. The location adjustment sub—system may also output data indicative of the epoch to which the localization has been adjusted.

The localization module thus uses a location from the map object matching sub—system and the displacement map data to adjust the location to provide an absolute location, which is output for use in determining the location of the vehicle. The absolute location is a location according to a common reference system as used in the vehicle e.g. as described in in ITRF2014.

Figure 13A:
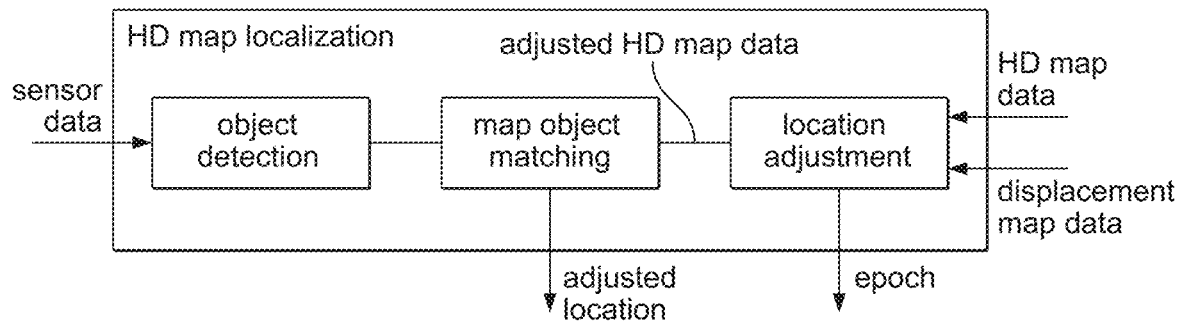
FIG. 13A shows an HD map localization module including a location adjustment sub-system in accordance with another embodiment in which the module operates on HD map objects.

In a variant the HD map localization module operates on HD map objects as shown in FIG. 13A. In these embodiments vehicle sensor data is input to an object detection sub—system as in the embodiment of FIG. 12. Rather than performing adjustment to compensate for the effects of crustal dynamics once an object has been map matched and the position transformed to the vehicle reference system, in these embodiments, the location adjustment sub—system acts upon the HD map data itself. The HD map data is input to the location adjustment sub—system, and displacement map data accessed and used with the HD map data to provide adjusted HD map data for input to the map object matching sub—system. The adjusted HD map data is map data in which the position of map objects according to the initial HD map data has been shifted using the displacement map data to account for changes in the position of the map objects due to crustal dynamics occurring between the map epoch, and the current time e.g. time of localization. The HD map data may therefore be considered to have been shifted from an initial, first reference frame, to a second, adjusted reference frame. The location adjustment sub—system may output the epoch to which adjustment has been performed.

The map matching of an object may then be performed in relation to the adjusted HD map data. The determined position of the location of the object determined according to the adjusted HD map data provides a position of the object already adjusted for the effects of crustal dynamics. In this way, by first adjusting the HD map data itself, map matching of multiple objects for a particular epoch e.g. localization epoch may be more efficiently performed, rather than needing to adjust the location of detected objects on an object by object basis.

Figure 13B:
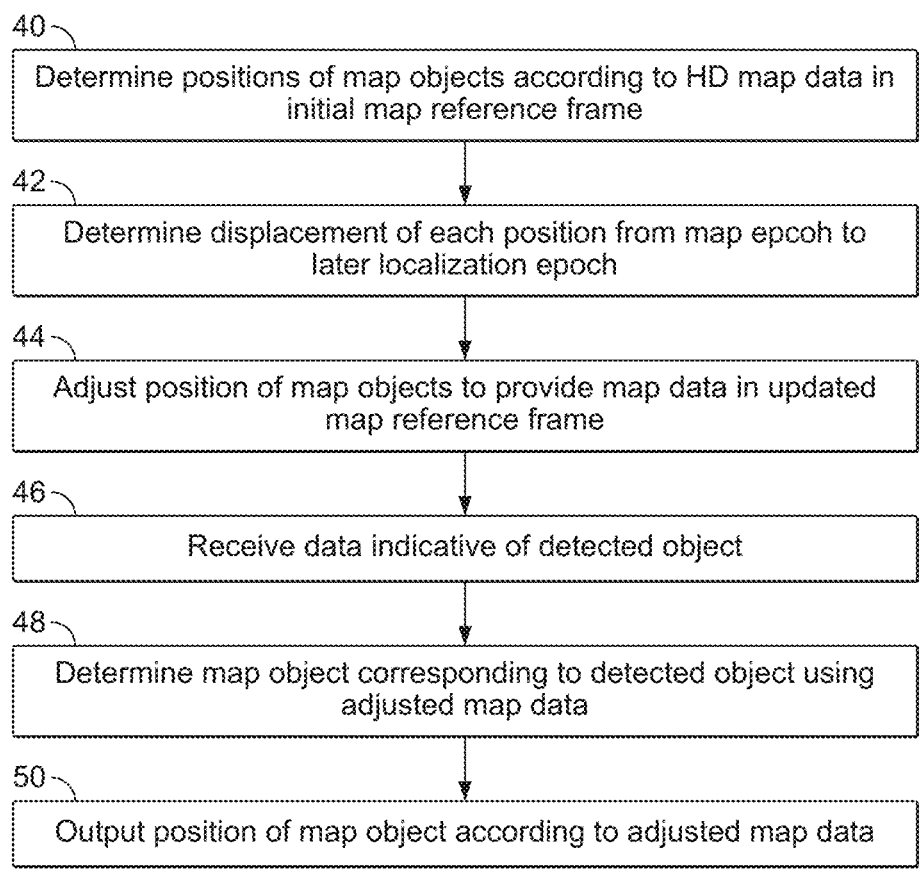
FIG. 13 B illustrates an exemplary method using the HD map localization module of FIG. 13A.

One embodiment of a method using the localization module of FIG. 13A will now be described by reference to FIG. 13B.

In step 40 positions of map objects according to HD map data in initial map reference frame are determined.

In step 42 a displacement of each position from map epoch to later localization epoch is determined.

In step 44 the position of map objects to provide map data is adjusted to provide map data in an updated map reference frame.

In step 46 data indicative of a detected object is received.

In step 48 a map object corresponding to detected object using adjusted map data is detected.

In step 50 a position of the map object according to adjusted map data is output.

In yet another variant, the localization adjustment may be performed in relation to retrieved HD map information e.g. map objects. This variant is shown in more detail in FIG. 14.

Figure 14:
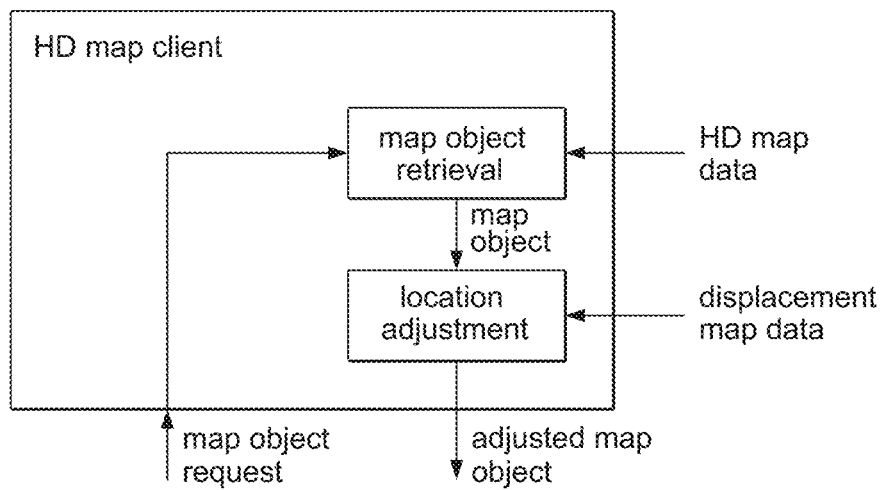
FIG. 14 shows an embodiment in which location adjustment is performed in respect of retrieved HD map information.

FIG. 14 shows an HD map client associated with a vehicle. The HD map client receives an HD map object request from an HD map application in the computing infrastructure of the vehicle (not shown). The HD map client processes the request as usual retrieving the relevant HD map data and extracting the requested HD map object. However, the map object is then provided to the location adjustment sub—system. The location adjustment sub—system receives the map object and adjusts the position e.g. coordinates of the object to the common coordinate system as used in the vehicle. Thus, the position of the map object is transformed from the map reference frame to the vehicle reference frame. However, this transformation is performed in a manner which adjusts for the effects of crustal dynamics. The location adjustment sub—system determines a displacement for the position i.e. coordinates of the map object using the displacement map data, and provides, as output, the position of the adjusted map object in the reference frame of the vehicle system.

The location adjustment sub—system may associated data indicative of the displacement for the map object with the data indicative of the map object for optional use by an HD map application.

HD Map Updates after Major Map Release

While embodiments have been described with particular reference to the case in which a position is adjusted from a map generation epoch to a later localization epoch, the invention is equally applicable to other epoch adjustments in either direction e.g. to adjustments from a later epoch to an earlier map generation epoch. For example, in some cases, a HD map compiler may need to provide updates to a relatively small portion of a map area due to changes of the road network or to the detectable geospatial objects. This may require a map compiler to generate displacement from a later acquisition epoch to an earlier map (generation) epoch in order to avoid recompiling the entire HD map. In some embodiments, the displacement map data is used to determine a displacement of the position of a sensed object from a later acquisition epoch to the earlier map generation epoch.

Tile Based Displacements (Displacement on a Tile Basis Instead of a Global Map Basis)

In accordance with the invention in any of its aspects or embodiments a digital map with which the techniques are used may comprise a plurality of levels (or layers) with each level being divided into a plurality of tiles, in the manner described above. That is, the tiles may be arranged into a plurality of respective levels and each map tile may thus contain object information for its associated level of the map. For instance, different levels of the map may be used to store different types of object data. Each map level may thus contain a sub—set of the available map information. For example, a base level of the map may contain the basic road geometry information (e.g. a set of arcs and nodes defining the navigable (e.g. road) network). Different types of object and/or attributes may then be stored at progressively higher levels in the map. This structure advantageously allows the map based application(s) requiring the map data to extract map data from any of the levels such that it is possible to extract (only) the relevant information for a map based application, depending on what information is required by the application.

The present invention may be used generally in the context of the generating and provision of digital map data. In particular, the present invention may be used in conjunction with the provision of high definition digital map data. It will be appreciated that such maps are typically complex data structures including roads, road lanes, junctions, traffic information, points of interest and many other types of information. Accordingly, in order to reduce the amount of data that must be stored locally to a vehicle running a map—based application and/or to reduce the bandwidth required for transmitting the map data to the vehicle, the overall area being represented by the digital map may be (and in some embodiments of the present invention is) divided into a plurality of smaller area regions for data storage purposes, such that the device need only retrieve data relating to regions relevant to its current position and/or predicted driving path. In the present invention the smaller area regions into which the overall area is divided into for mapping purposes are referred to as "tiles". However, it will be appreciated that other equivalent terms could be used, and that the term "tile" does not imply any particular restrictions on the shape or size of the regions into which the digital map is divided.

The use of such a tile—based approach may help provide a more efficient transmission and distribution of the map data from the various map data sources to the vehicles requiring the map data. For instance, an advantage of the tile—based approach is that it is possible to readily compile map data from different sources at the server (or at a plurality of servers) into a set of respective tiles, and then deliver or provide relevant map data, e.g. on a tile—by—tile basis, to vehicles requiring map data for the regions covered by the tiles. The tile data structure(s) can then be unpacked, e.g., by a suitable client application (interface) executing on one or more processor(s) on—board the vehicle in order to extract the desired (map) object data which can then be distributed to various map—based applications running within the in—vehicle environment, as required.

Of course, it is not necessary that a tile—based approach is used.

In some embodiments, displacement maps may be delivered included in a displacement map layer. In one such embodiment, the map tile contains displacement triangles that are relevant to that map tile. One such embodiment is illustrated in FIG. 15.

Figure 15:
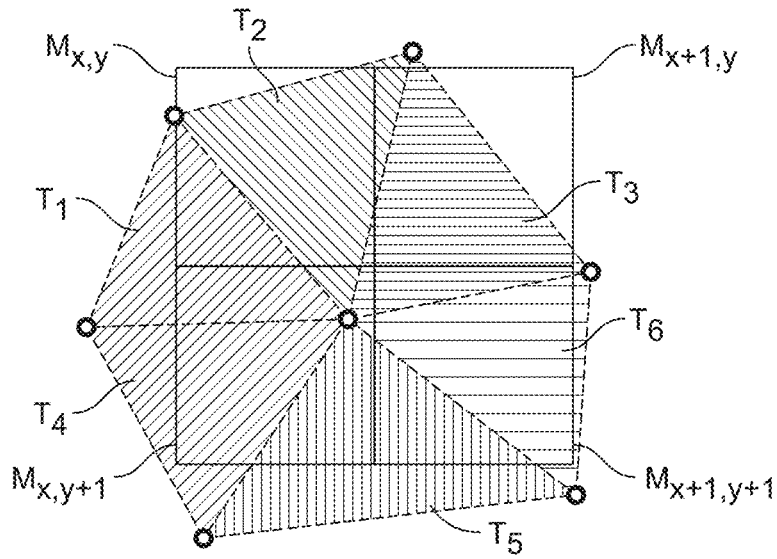
FIG. 15 illustrates one example of a method for deriving displacement map data for use with a tile based map.

FIG. 15 shows a displacement map with 6 triangles and 4 map tiles. The tiles and triangles are of comparable size. Map tile $M_{x,y+1}$ needs to reference all six triangles, $M_{x+1,y+1}$ only requires three triangles.

Figure 16:
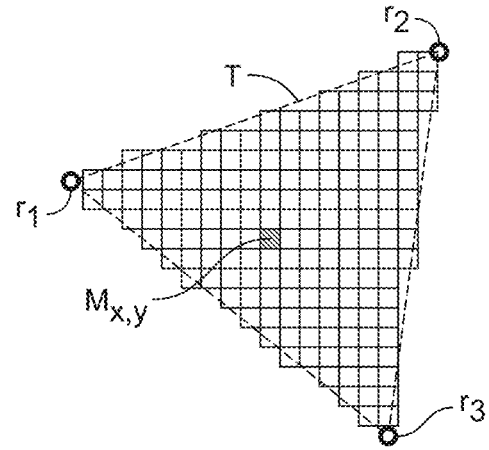
FIG. 16 illustrates another example of a method for deriving displacement map for use with a tile based map.

For larger triangles the situation is different as shown in FIG. 16.

FIG. 16 shows a large triangle T spanning a large number of map tiles M. In this case, map tile Mx,y only contains information for the triangle T.

The example of FIG. 16 shows a triangle that is substantially larger than a map tile. Hence, a variant implementation may associate a single displacement value e.g. vector with a map tile of an HD map layer. Each of these map tiles may then be assigned a single displacement value. Such a variant may then distribute the displacements as a mesh—grid. In general, as the displacements are generally similar for cells that are relatively close, such a displacement map can be efficiently encoded using compression techniques (run length encoding, image compression, DCT encoding, etc). This variant also can be used to deliver displacement speed maps or other types of displacement interpolation maps. The parameters for these variant maps can be encoded and distributed as a mesh grid (representing a collection of small map tiles).

It will be appreciated that different formats of displacement map data may be used depending upon the context for which the data is required, and system capabilities etc.

Variants using map tiles not enable such efficient encoding to be provided than might a separate displacement map using encodings of triangles only, but may provide other advantages in certain contexts.

The foregoing detailed description has been presented for the purposes of illustration and description. It is not intended to be exhaustive or to limit the technology described herein to the precise form disclosed. Many modifications and variations are possible in the light of the above teaching. The described embodiments were chosen in order to best explain the principles of the technology described herein and its practical applications, to thereby enable others skilled in the art to best utilise the technology described herein, in various embodiments and with various modifications as are suited to the particular use contemplated. Thus, the features disclosed in this specification, the figures and/or the claims may be material for the realization of various embodiments, taken in isolation or in various combinations thereof. Furthermore, although the present invention has been described with reference to various embodiments, it will be understood by those skilled in the art that various changes in form and detail may be made without departing from the scope of the invention as set forth in the accompanying claims.

What is claimed is:

1. A method for compiling a digital map, comprising:
acquiring sensor data indicative of a respective position of at least one object with respect to the Earth's surface at a first time; and
compiling the digital map at a second time different than the first time, the compiling comprising:
obtaining displacement map data including, for each reference location among one or more reference locations, data indicative of a change in a position of the reference location with respect to Earth's surface over time as a result of crustal dynamics;
adjusting, based on the displacement map data, the respective position of the at least one object to compensate for a change in the respective position of the at least one object with respect to the Earth's surface expected to have occurred between the first time and the second time as a result of the crustal dynamics; and
incorporating information about the at least one object into the digital map based on the respective position of the at least one object.

2. The method of claim 1, wherein adjusting the respective position of the at least one object based on the displacement map data includes:
identifying, from among a set of map tiles in the digital map, a given map tile in which the respective position is located;
determining displacements for one or more reference locations associated with the given map tile using the displacement map data;
determining an adjustment value based on the displacements for the one or more reference locations associated with the given map tile; and
updating, based on the adjustment value, the respective position of the at least one object.

3. The method of claim 2, wherein:
the displacement map data includes a plurality of shapes, each shape being defined by a respective plurality of reference locations and each shape being associated with one or more map tiles based on a match between a location associated with the shape and locations of the one or more map tiles;

some or all of the given map tile is associated with a given shape; and
the displacements for the one or more reference locations associated with the given map tile are determined based on the data indicative of the change in the position of the respective plurality of reference locations defining the given shape.

4. The method of claim 3, wherein some or all shapes among the plurality of shapes are triangles.

5. The method of claim 2, wherein determining the adjustment value based on the displacements for the one or more reference locations includes:
determining, via an interpolation, a relationship between each of the one or more reference locations and the respective position of the at least one object; and
determining, based on the relationships and the data indicative of the change in the position of each of the one or more reference locations, the adjustment value as a displacement of the respective position of the at least one object.

6. The method of claim 5, wherein the interpolation is a barycentric interpolation.

7. The method of claim 2, wherein identifying the given map tile includes:
identifying, using the respective location of the at least one object and information about the location of each map tile among the plurality of map tiles in the digital map, the given map tile from among the plurality of map tiles.

8. The method of claim 1, wherein the data indicative of the change in the position of each reference location comprises, for at least one pair of times:
a speed of change of the position or a distance of the change in the position; and
a direction of the change of the position.

9. The method of claim 1, wherein incorporating the information about the at least one object into the digital map includes:
adding, to the digital map, coordinate information identifying the respective position of the at least one object.

10. The method of claim 1, wherein incorporating the information about the at least one object into the digital map includes:
storing, into one or more data storage media, the digital map including the information about the at least one object.

11. The method of claim 1, wherein compiling the digital map includes:
storing a plurality of layers in the digital map, each layer including a different part of data associated with the digital map, wherein:
a first layer among the plurality of layers includes object position information; and
a second layer among the plurality of layers includes the displacement map data.

12. The method of claim 1, wherein the displacement map data and the digital map are configured to be used together to determine locations of objects for navigation operations.

13. A method for updating, at a second time, a digital map that was compiled at a first time different than the second time, the method comprising:
acquiring sensor data indicative of a respective position of at least one object with respect to the Earth's surface at a third time; and
updating the digital map, the updating comprising:
obtaining displacement map data including, for each reference location among one or more reference locations, data indicative of a change in a position of the reference location with respect to Earth's surface over time as a result of crustal dynamics;

adjusting, based on the displacement map data, the respective position of the at least one object to compensate for a change in the respective position of the at least one object with respect to the Earth's surface expected to have occurred between the second time and the third time as a result of the crustal dynamics; and updating existing information about the at least one object in the digital map based on the respective position of the at least one object.

14. The method of claim 13, wherein adjusting the respective position of the at least one object based on the displacement map data includes:

identifying, from among a set of map tiles in the digital map, a given map tile in which the respective position is located;

determining, using the displacement map data, displacements for one or more reference locations associated with the given map tile;

determining an adjustment value based on the displacements for the one or more reference locations associated with the given map tile; and updating, based on the adjustment value, the respective position of the at least one object.

15. The method of claim 14, wherein:

the displacement map data includes a plurality of shapes, each shape being defined by a respective plurality of reference locations and being associated with one or more map tiles based on a match between a location associated with the shape and locations of the one or more map tiles;

some or all of the given map tile is associated with a given shape; and the displacements for the one or more reference locations associated with the given map tile are determined based on the data indicative of the change in the position of the respective plurality of reference locations defining the given shape.

16. The method of claim 14, wherein determining the adjustment value based on the displacements for the one or more reference locations includes:

determining, via interpolation, a relationship between each of the one or more reference locations and the respective position of the at least one object; and determining, based on the relationships and the data indicative of the change in the position of each of the one or more reference locations, the adjustment value as a displacement of the respective position of the at least one object.

17. The method of claim 14, wherein identifying the given map tile includes:

identifying, using the respective location of the at least one object and information about the location of each map tile among the plurality of map tiles in the digital map, the given map tile from among the plurality of map tiles.

18. The method of claim 13, wherein the data indicative of the change in the position of each reference location comprises, for at least one pair of times:

a speed of change of the position or a distance of the change in the position; and a direction of the change of the position.

19. The method of claim 13, wherein updating the existing information about the at least one object in the digital map includes:

replacing, in the digital map, coordinate information identifying the respective position of the at least one object.

20. The method of claim 13, wherein updating the existing information about the at least one object in the digital map includes:

updating, on one or more data storage media, the digital map including the information about the at least one object.

21. The method of claim 13, wherein the displacement map data and the digital map are configured to be used together to determine locations of objects for navigation operations.

22. A computer—readable storage medium storing instructions that, when executed by one or more processors, cause the one or more processors to perform a method for compiling a digital map, the method comprising:

acquiring sensor data indicative of a respective position of at least one object with respect to the Earth's surface at a first time; and compiling the digital map at a second time different than the first time, the compiling comprising:

obtaining displacement map data including, for each reference location among one or more reference locations, data indicative of a change in a position of the reference location with respect to Earth's surface over time as a result of crustal dynamics;

adjusting, based on the displacement map data, the respective position of the at least one object to compensate for a change in the respective position of the at least one object with respect to the Earth's surface expected to have occurred between the first time and the second time as a result of the crustal dynamics; and incorporating information about the at least one object into the digital map based on the respective position of the at least one object.

* * * * *